United States Patent
Hu et al.

(10) Patent No.: US 7,412,362 B2
(45) Date of Patent: Aug. 12, 2008

(54) RIVER MODELING

(75) Inventors: Yaohua Hu, Beijing (CN); Chen Li, Beiging (CN); Baining Guo, Beijing (CN); Bruno Silva, Clyde Hill, WA (US); Alex Pfaffe, Redmond, WA (US); Xin Tong, Beijing (CN); Gang Chen, Behing (CN); Hongbo Jiang, Cleveland, OH (US)

(73) Assignee: Microsoft Corporation, Redmond, WA (US)

( * ) Notice: Subject to any disclaimer, the term of this patent is extended or adjusted under 35 U.S.C. 154(b) by 351 days.

(21) Appl. No.: 11/132,166

(22) Filed: May 18, 2005

(65) Prior Publication Data

US 2007/0038421 A1    Feb. 15, 2007

(51) Int. Cl.
G06F 17/50    (2006.01)
G06T 15/00    (2006.01)
(52) U.S. Cl. ................. 703/2; 703/9; 703/12; 345/428; 345/587
(58) Field of Classification Search ...... 703/2, 703/9, 12; 345/428, 473, 584, 587
See application file for complete search history.

(56) References Cited

U.S. PATENT DOCUMENTS

| | | | | |
|---|---|---|---|---|
| 3,767,901 A | * | 10/1973 | Black et al. | 318/568.11 |
| 4,906,940 A | * | 3/1990 | Greene et al. | 382/100 |
| 6,765,584 B1 | * | 7/2004 | Wloka et al. | 345/584 |
| 7,173,622 B1 | * | 2/2007 | McLaughlin | 345/473 |
| 2001/0027456 A1 | * | 10/2001 | Lancaster et al. | 707/104.1 |
| 2004/0181382 A1 | * | 9/2004 | Hu et al. | 703/9 |
| 2005/0228625 A1 | * | 10/2005 | Lachman | 703/9 |

* cited by examiner

Primary Examiner—Thai Phan
(74) Attorney, Agent, or Firm—Lee & Hayes, PLLC

(57) ABSTRACT

Systems and methods are presented for real-time realistic river modeling. In one implementation, when provided with the physical features of a modeled terrain, the systems and methods described herein automatically determine a watercourse route in relation to the terrain and calculate river borders. The systems and methods then calculate a surface structure for the river between the borders and map texture coordinates to the surface structure. The systems and methods apply textures at the texture coordinates to provide an animated, view-dependent representation of wave geometries for the modeled water surface including reflection, refraction, and Fresnel effects.

20 Claims, 20 Drawing Sheets

GENERATION OF THIS MESH INCLUDED USE OF TRIANGLE MESH GENERATOR BY
JONATHAN RICHARD SHEWCHUK

GENERATION OF THIS MESH INCLUDED USE OF TRIANGLE MESH GENERATOR BY
JONATHAN RICHARD SHEWCHUK

GENERATION OF THIS MESH INCLUDED USE OF TRIANGLE MESH GENERATOR BY JONATHAN RICHARD SHEWCHUK

GENERATION OF THIS MESH INCLUDED USE OF TRIANGLE MESH GENERATOR BY
JONATHAN RICHARD SHEWCHUK

US 7,412,362 B2

RIVER MODELING

TECHNICAL FIELD

The subject matter relates generally to computer graphics and more specifically to river modeling.

BACKGROUND

Visualization of river surfaces is an important topic in computer graphics because rivers are present in many natural scenes. Although many conventional techniques have been developed for river simulation and rendering in the film industry, these techniques are only appropriate for off-line rendering of animated sequences. Real-time applications such as games typically model a conventional river surface as a texture mapped plane with simple lighting effects, while realistic wave geometry and sophisticated lighting effects are ignored. Conventional methods for graphically providing river scenes are often merely derived from modified photographs, as in the case of many flight simulators, or the river simulations are laboriously constructed by artists who manually create river graphics—literally by hand—for storage and later retrieval during a game.

SUMMARY

Systems and methods are presented for real-time realistic river modeling. In one implementation, when provided with the physical features of a modeled terrain, the systems and methods described herein automatically determine a watercourse route in relation to the terrain and calculate river borders. The systems and methods then calculate a surface structure for the river between the borders and map texture coordinates to the surface structure. The systems and methods apply textures at the texture coordinates to provide an animated, view-dependent representation of wave geometries for the modeled water surface including reflection, refraction, and Fresnel effects.

DETAILED DESCRIPTION

Overview

Systems and methods are described herein for graphically modeling flowing water. A modeled water flow will be loosely referred to herein as a "river" but other types of water flows and fluid flows can also be modeled by the described systems and methods. In one implementation, the systems and methods calculate the watercourse route of a river on a piece of terrain and realistically animate and render the river's water surface in real-time. The water surface's wave geometry can be represented view-dependently by a triangulated surface structure model with surface detail described by a dynamic bump map. The texture coordinates in the bump map can be animated to simulate flowing water. An illumination model is included that renders reflection, refraction, and Fresnel effects which are critical for producing the look and feel of water. This modeling, including real-time synthesis and animation of a terrain's natural water flow, can be used in graphics applications, such as computer games.

The systems and methods described herein automatically compute a river "from scratch," e. g., with no more than an artist's polyline drawing of terrain as the raw starting material. Not only do the systems and methods described herein automatically compute a physically accurate watercourse from the physical characteristics of a provided terrain sketch, but they provide unprecedented realism through accurate modeling of realistic wave, watercourse, and illumination characteristics. Besides providing a rendering engine for real-time river scenes in a game, the systems and methods also provide a modeling tool for an artist or software architect to develop the look and feel of a river that fits the needs of a particular game or animation.

In one implementation, to produce a realistic, real-time river, e.g., in gaming scenery, an exemplary system receives an artist's rough polyline conception of terrain, e.g., stored in computer memory, and generates a realistic watercourse—i.e., a flow path. The system may compute, in real-time, the course of a river from highland to lowland, including waterfalls, narrow segments of the river that have fast water flow, and wide segments of the river that have relatively slow water flow, complete with waves and realistic view-dependent lighting that takes into account reflection, refraction, and many other optical effects.

Exemplary System

Figure 1:
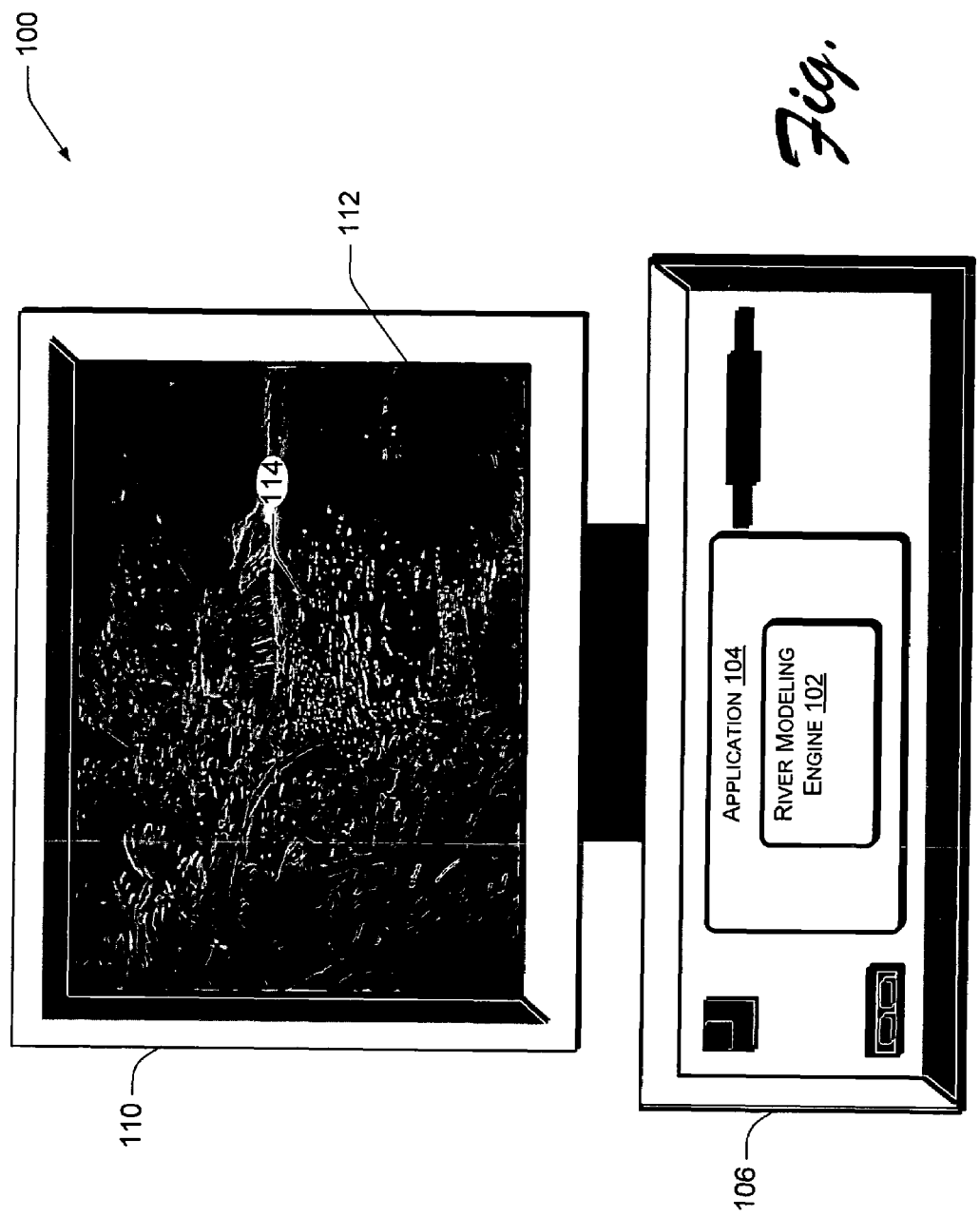
FIG. 1 is a diagram of an exemplary river modeling system.

FIG. 1 shows an exemplary river modeling system 100. An exemplary river modeling engine 102 can be associated with an application 104, such as a game or simulator, running on a computing device 106. The river modeling engine 102 may be included as part of the application 104 and both the river modeling engine 102 and the application 104 may be implemented in hardware, software, or combinations of hardware, software, firmware, etc.

In one implementation, when the application 104 executes on the computing device 106, for example when a user plays a game application 104, the river modeling engine 102 may perform various parts of a river modeling architecture or "pipeline" in various manners to create real-time river synthesis, simulation, and animation. The river modeling engine 102 may preprocess some segments of the pipeline, and perform other segments of the pipeline in real-time to produce an overall real-time rendering of a flowing river scene 108. Since a flowing river scene 108 is visually a three-dimensional scene rendered on a two dimensional display monitor 110, the river modeling engine 102 takes into account many of the issues associated with visualizing water-since water has many physical and optical properties that vary from near viewpoints 112 in one part of the displayed watercourse to far viewpoints 114 in other parts of the displayed watercourse.

Thus, in one implementation, the river modeling pipeline includes segments for calculating a watercourse or a given terrain, creating river borders that are physically plausible, generating a view-dependent river surface (including waves), mapping a texture onto the river surface, and illuminating the river surface. These pipeline segments may be exemplified in the exemplary river modeling engine 102, now described in greater detail.

Exemplary River Modeling Engine

Figure 2:
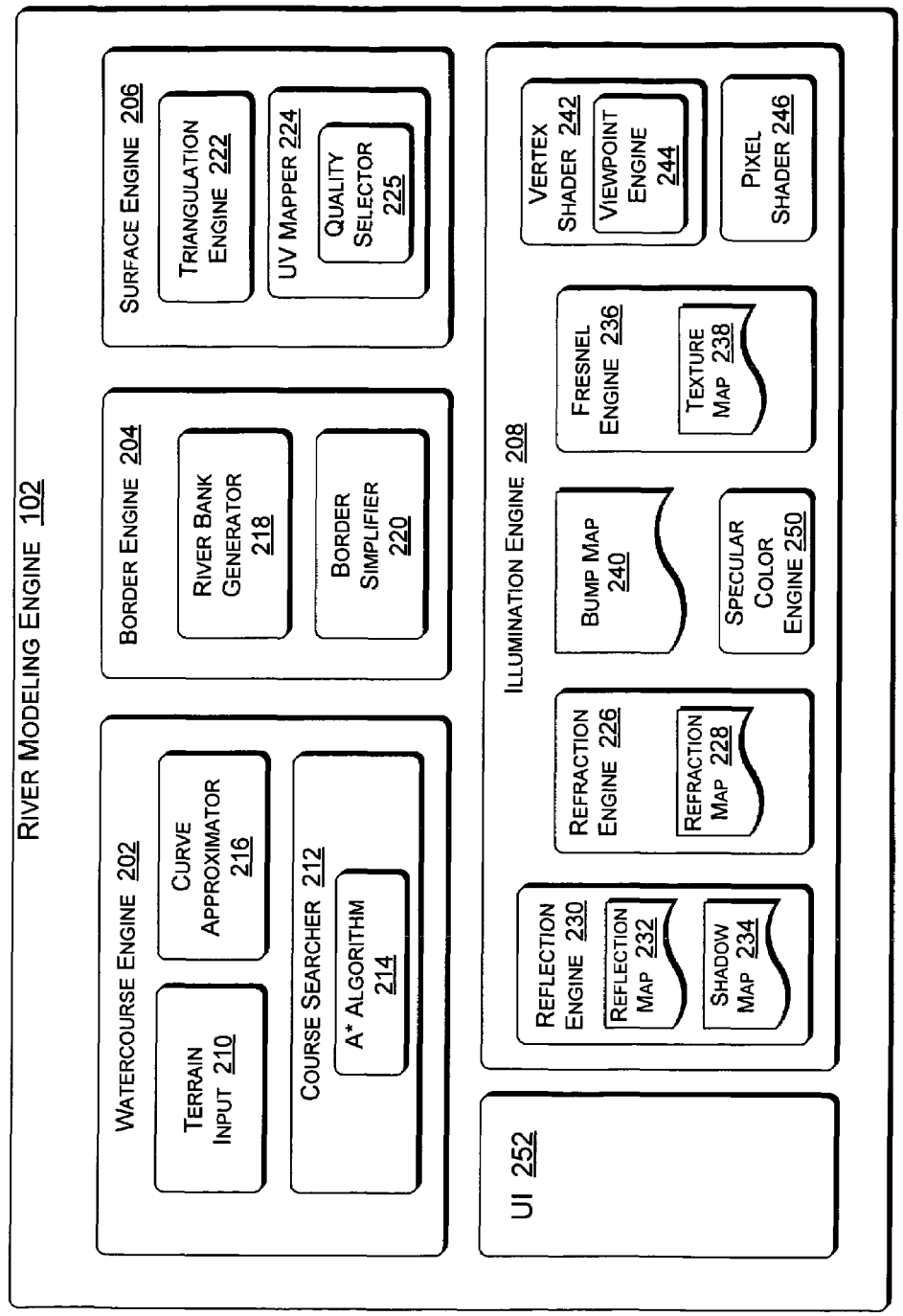
FIG. 2 is a block diagram of an exemplary river modeling engine.

FIG. 2 shows an overview of the exemplary river modeling engine 102 of FIG. 1 in greater detail. The river modeling engine 102 illustrated in FIG. 2 is meant to provide one example arrangement for the sake of overview. Many other arrangements of the illustrated components, or similar components, are possible. Techniques performed by such a river modeling engine 102 will be explained in greater detail with respect to later Figures. An exemplary river modeling engine 102 can be executed in hardware, software, or combinations of hardware, software, firmware, etc.

The exemplary river modeling engine 102 includes a watercourse engine 202 to determine where the river flows in relation to input terrain, e.g., from an artist's polyline rendering of a terrain. The river modeling engine 102 also includes a border engine 204, a surface engine 206, and an illumination engine 208. The border engine 204 uses contour line searching to find a river's borders on the terrain. The surface engine 206 builds a surface "mesh"—for example, builds triangles to render the geometry of the river surface and then maps texture coordinates to the surface mesh. The illumination engine 208 performs the final rendering, which can include the lighting of the river surface, including refraction, reflection, and Fresnel effects.

The engine components described above may include subcomponents. The watercourse engine 202 may include a terrain input 210, a course searcher 212 that includes a search algorithm 214, and a curve approximator 216. The border engine 204 may further include a river bank generator 218 and a border line simplifier 220. The surface engine 206 may further include a triangulation engine 222 and a UV mapper 224 that has a quality selector 225. The illumination engine 208 may further include a refraction engine 226 with a refraction map 228, a reflection engine 230 with a reflection map 232 and a shadow map 234, a Fresnel engine 236 with one or more texture map(s) 238, a bump map 240, a vertex shader 242 with a viewpoint engine 244, and a pixel shader 246. The illumination engine may also include a specular color engine 250. A user interface (UI) 252 allows an artist to use the river modeling tool 102 as a development and preview tool. These engine components will now be discussed in greater detail.

Watercourse Engine

Figure 3:
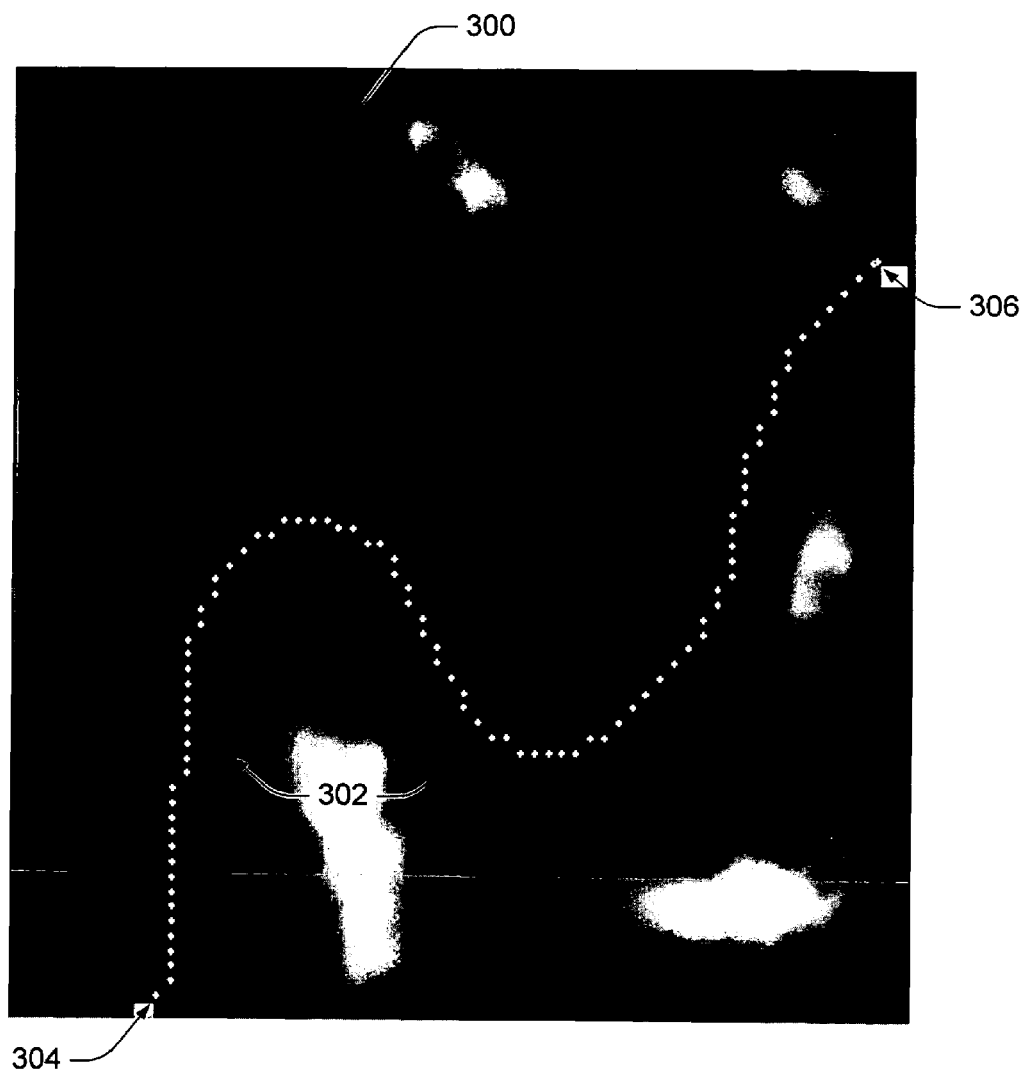
FIG. 3 is a diagram of an exemplary watercourse calculated by the river modeling engine of FIG. 2.

As shown in FIG. 3, given a rendering of terrain 300 provided to the terrain input 210, the watercourse engine 202 determines a series of discrete points 302 that describe a path. The path is a watercourse that flows, for example, from a first point 304 to a second point 306, such that the water flows downhill, as water always seeks the lowest place, and in some implementations, so that the river surface is always below the level of the terrain near the river banks.

In one implementation, the course searcher 212 uses an "A*" algorithm 214 to find a course through which water would flow between the two points (or nodes) based on some physical properties of the terrain 300, such as land shape and elevation changes, etc. In one implementation, the course searcher 212 uses an A* algorithm 214 that is modified from a conventional A* algorithm 214. The physical simulation carried out via the modified A* algorithm 214 calculates a cost from parent node to child node, in which the cost may equal the parent node absolute height minus the child node absolute height. Simulation between other nodes representing parts of the river can use a conventional A* algorithm 214.

In one implementation, in a terrain without a pre-existing watercourse, the A* algorithm 214 searches a relatively wider area to find the watercourse, which consumes more time and computer memory. One option is for the artist to "dig" a trench in which the watercourse will be found by the course searcher, before providing the terrain to the terrain input 210. This limits the amount of land that the A* algorithm searches to find a watercourse. Optimizing the parameters of the A* algorithm 214 depends on the type of terrain, such as the total size, searching size, roughness, distance between control nodes, etc.

The set of discrete points 302 obtained by the A* algorithm 214 can be difficult to parameterize making it difficult to obtain a good mapping result for making a river surface. In other words, any short-term segment of the path described by the point set 302 may be as tortuous as the provided terrain and the changes of direction between local points can be fairly random and add undue complexity to the more global task of synthesizing the entire river.

Figure 4:
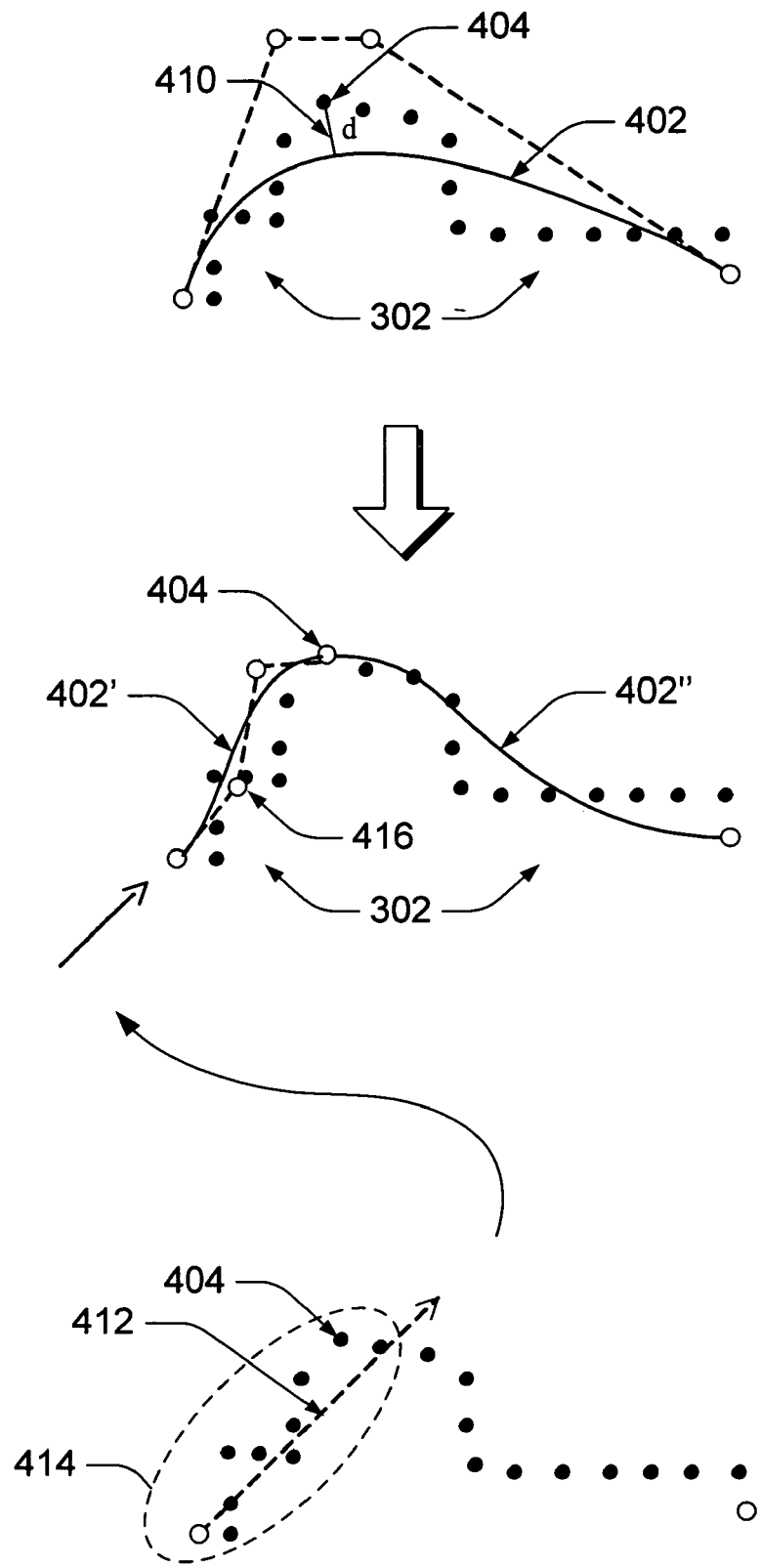
FIG. 4 is a diagram of exemplary watercourse approximation using Bezier curves.
Figure 5:
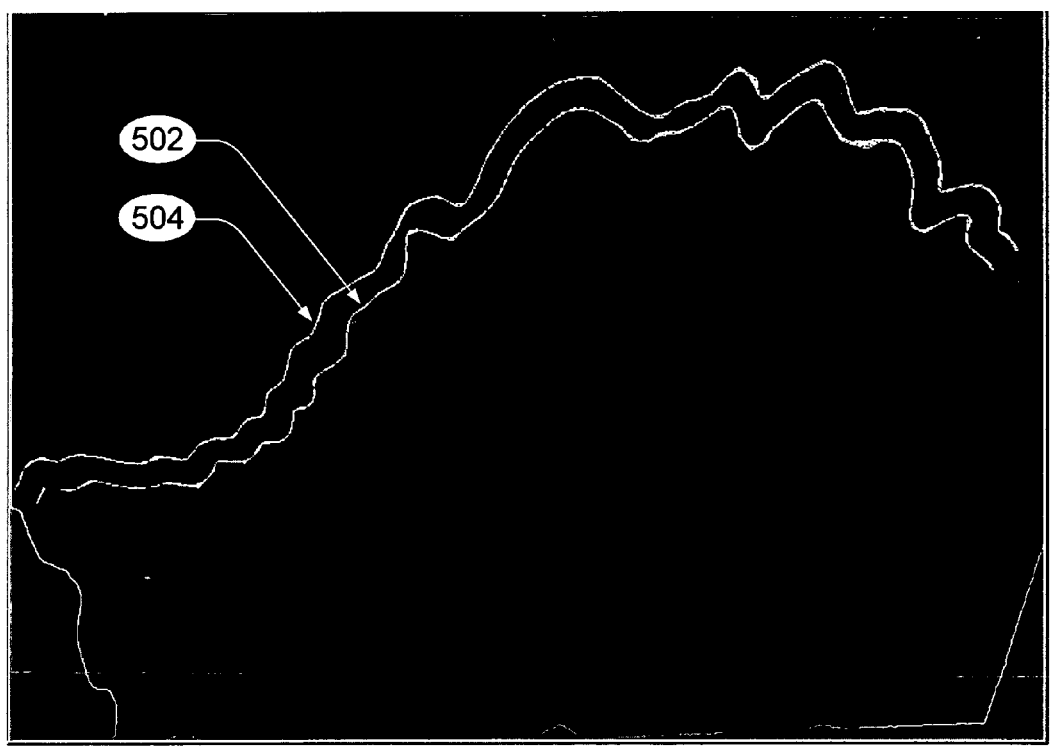
FIG. 5 is a diagram of exemplary river borders calculated by the river modeling engine of FIG. 2.

A curve approximator 216 fits the point set 302 into piecewise curves, such as Bezier curves. The curve fitting results in relatively few curves that are described by only a few parameters each. This greatly increases the efficiency of the subsequent calculations. One implementation uses cubic Bezier curve fitting, as described in "An algorithm for automatically fitting digitized curves," *Graphic Gems*, XI, 8, p. 612. As shown in FIG. 4, the curve approximator 216 fits one cubic curve onto the point set 302. The curve approximator 216 then splits the original curve 402 into a first split curve 406 and a second split curve 408, demarcating these at a "corner" point 404 selected because it has a maximum error "d" 410 that is greater than a selected tolerance. The steps are then iterated to approximate the original point set 302 with the curves.

To determine a tangent direction for beginning the curve fitting at a new corner point 404, the curve approximator 216 can use Least Squares Fitting to determine a straight line 412 from a number of near points 414 to get a direction of the line 412 as the curve fitting direction for a curve's control point 416.

Border Engine

The border engine 204 includes the river bank generator 218, which finds "borders" or "border lines" (502, 504) associated with the approximated watercourse curve (e.g., 402) that has been obtained by the curve approximator 216. These borders of the watercourse are the river banks or more precisely, the contour lines where the water meets the terrain, in a modeled river scene. Using the piecewise Bezier curves that are already in place, the processing of the river bank generator 218 is relatively fast.

Figure 6:
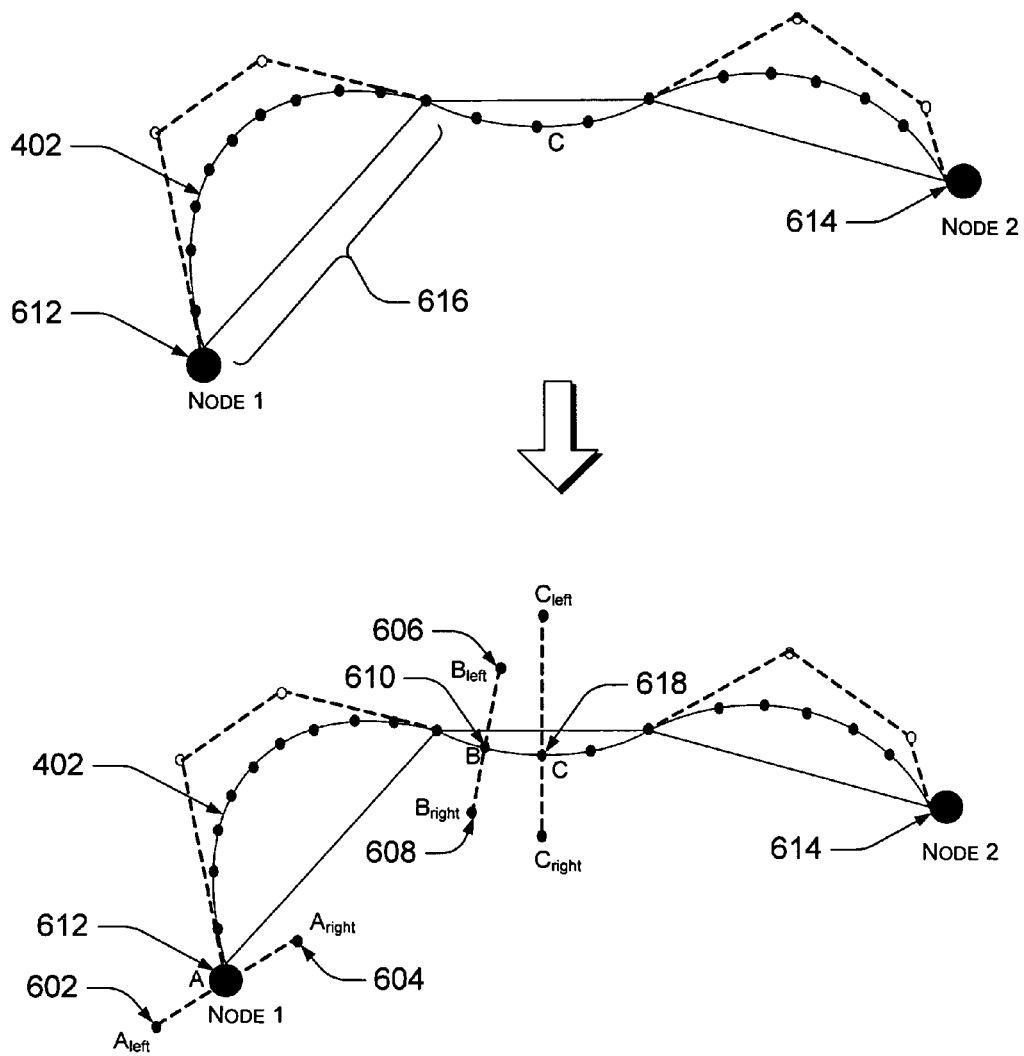
FIG. 6 is a diagram of an exemplary technique for calculating river borders.

Referring to FIG. 6, the river bank generator 218 first tries to find right and left contour lines that will be used for finding a series of bank points describing where the edge of the river meets the terrain on each side of the centerline. The border line simplifier 220 then smoothes these bank points into continuous waterlines on each side of the river (502, 504).

In one implementation, the river bank generator 218 obtains the discrete contour lines by adaptive interpolation of the piecewise Bezier curves that are approximating the calculated watercourse, i.e., the approximated watercourse output from the watercourse engine 202. The river bank generator 218 finds the end point for every two nodes (e.g., 612, 614) by adaptively interpolating each Bezier curve 616 by its arc length, which may be parameterized according to river channel width. To find the end point 610 for searching, the river bank generator 218 searches for a first point, such as node "A" 612, whose borders (e.g., as demarcated by 602, 604) have no error. The river bank generator 218 then finds the next point "C" 618 whose border does have error. The error may consist in exceeding the river maximum width parameter or overlapping the hypothetical water surface with the terrain, as at "C" 618. The river bank generator 218 then searches another candidate end point "B" 610, which is adjacent to "C" 618. Point "B" 610 has no error, so "B" 610 and "A" 612 are the end points for interpolating a curve segment to obtain a contour line offset from the centerline, to be used in the next part of the process.

Figure 7:
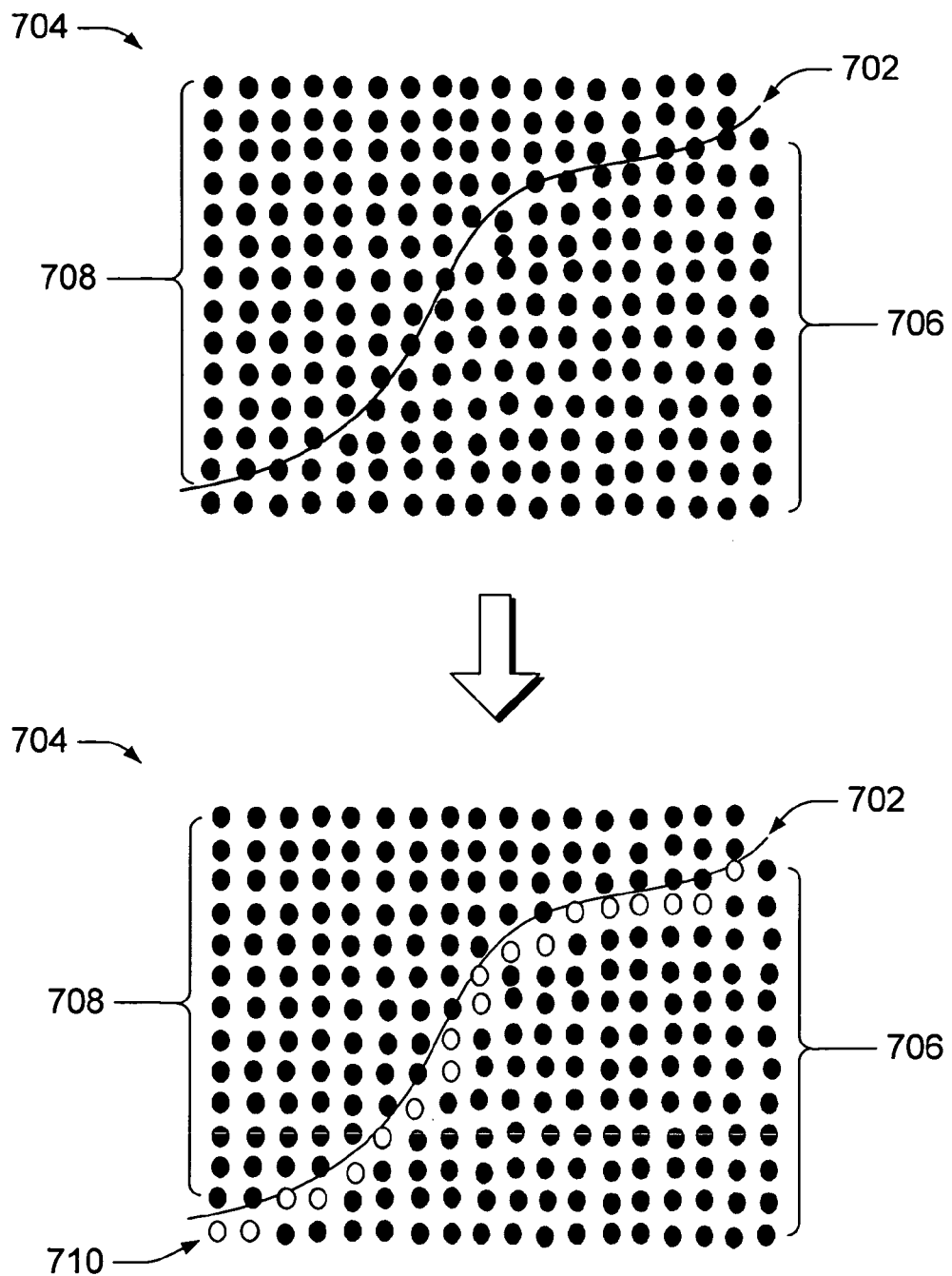
FIG. 7 is a diagram of an exemplary technique for matching calculated river borders to terrain coordinates.

As shown in FIG. 7, the river bank generator 218 tries to find a path of terrain coordinates for the contour line segment between each two end points from the previous part of the process. In other words, the river bank generator 218 now tries to translate the theoretical candidate contour lines obtained in the previous step by adaptively interpolating the Bezier curves making up the centerline, into land coordinates of the terrain map. To do so, each contour line 702 is imposed on the terrain map 704. On one side 706 of the contour line 702 the terrain height is greater than the river surface height. On the other side 708 of the contour line 702, the terrain height is below the river surface height. The river bank generator 218 defines a "bank point" as a point that is above the river surface and has a neighbor point that is below the river surface. Thus, a series of bank points 710 are obtained for the segment of the contour line 702.

Figure 8:
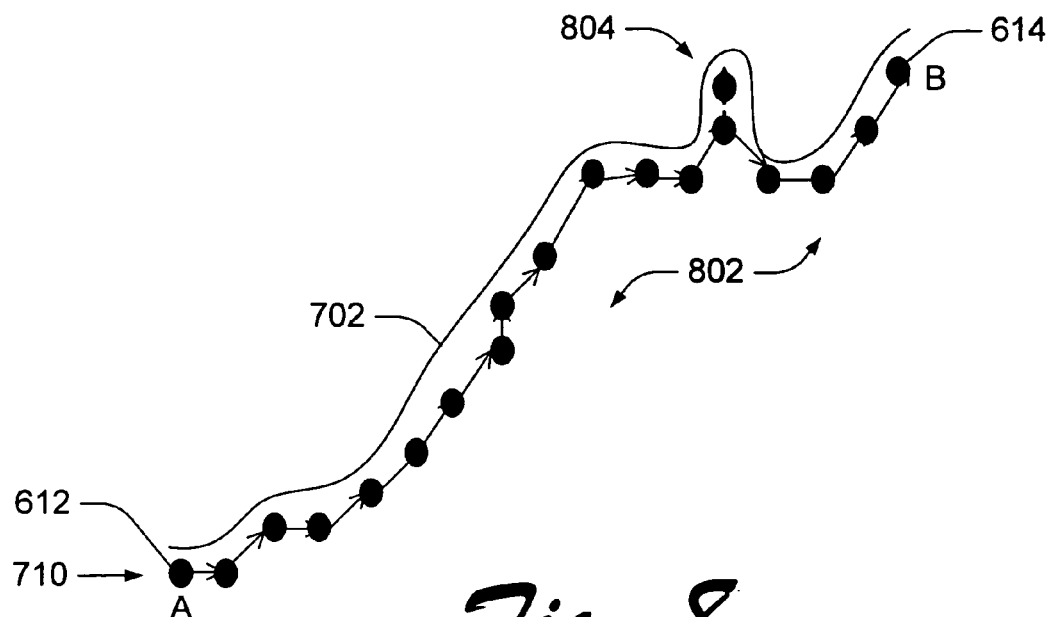
FIG. 8 is a diagram of an exemplary technique for simplifying a calculated river border.

As shown in FIG. 8, the river bank generator 218 finds a smooth path 802 among the bank points 710. The river bank generator 218 may apply a first traversal from point A 612 to point B 610 among the bank points 710. The traversal of a sub-branch 804 may be halted according to various criteria. Branch searching may be stopped via a distance test, for example, when:

Distance(pos_currentpoint, pos_bordersearching_endpoint) >3*

Distance(pos_bordersearching_beginpoint, pos_bordersearching_endpoint).

The branch searching may also be stopped when a "loop" contour line occurs and a real border path cannot be found; or, when the process runs out of the terrain.

Figure 9:
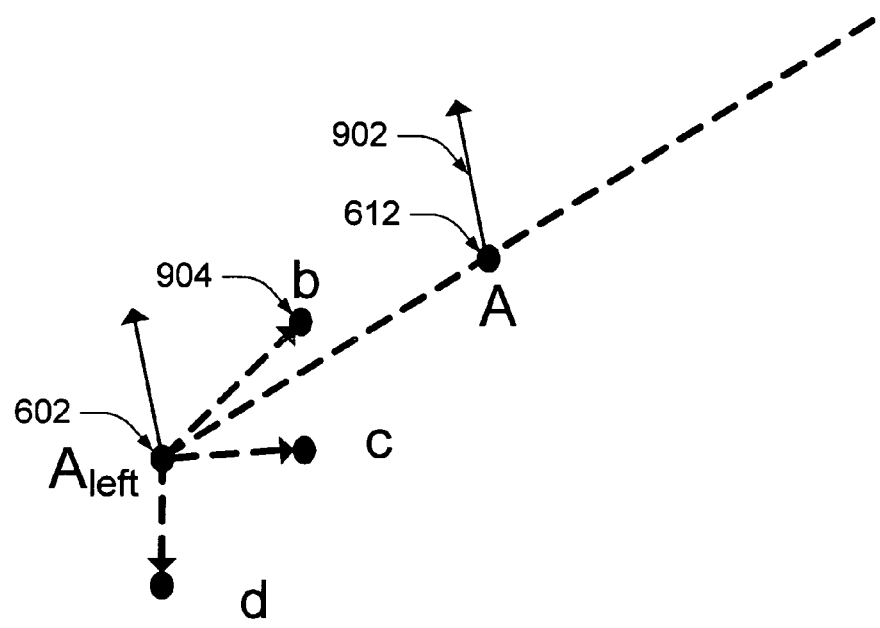
FIG. 9 is a diagram of an exemplary technique for selecting a search direction for the exemplary technique of FIG. 8.

As shown in FIG. 9, to estimate the beginning searching directions for the above processes, the border engine 204 may use the centerline direction 902 at the centerline point A 612 that the bank point 602 is associated with. For example, if point $A_{left}$ 602 is the bank point and point A 612 is the centerline point then the direction 902 is used as the beginning search direction. Thus, if point A1 602 has three candidate neighbor points, then point b 904 is the next searching point for the traversal, since point b 904 lies in the searching direction and the other two neighbor points do not.

Border Line Simplifier

After getting border lines 802 from the previous part of the river modeling engine 102 and before feeding these borders into the triangulation engine 222 component of the surface engine 206, the border line simplifier 220 simplifies these border lines 802 to obtain better triangulation results.

Figure 10:
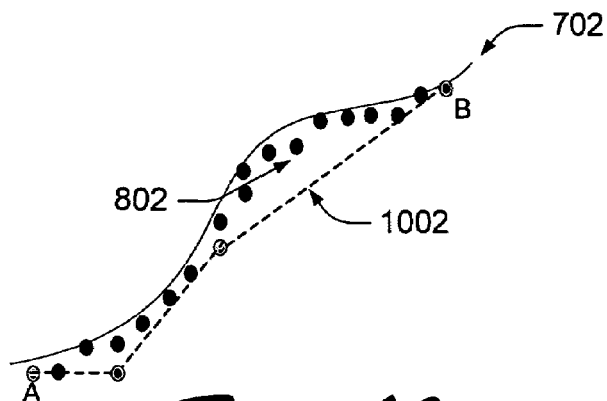
FIG. 10 is a diagram of an exemplary technique for creating a polyline from a calculated river border.

As shown in FIG. 10, the border line simplifier 220 tries to conserve the border edges to be mainly under the height of the terrain and to make sure that the original points on the smooth path 802 are enclosed by the new, simplified edges 1002. The border line simplifier 220 also tries to maintain control over average and minimum lengths of segments of the simplified edges, and to minimize simplification error.

Figure 11:
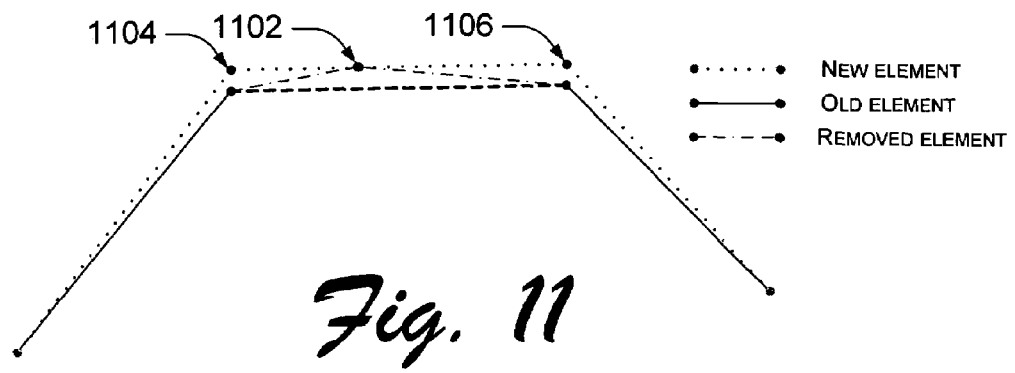
FIG. 11 is a diagram of an exemplary technique for simplifying a calculated river border.
Figure 12:
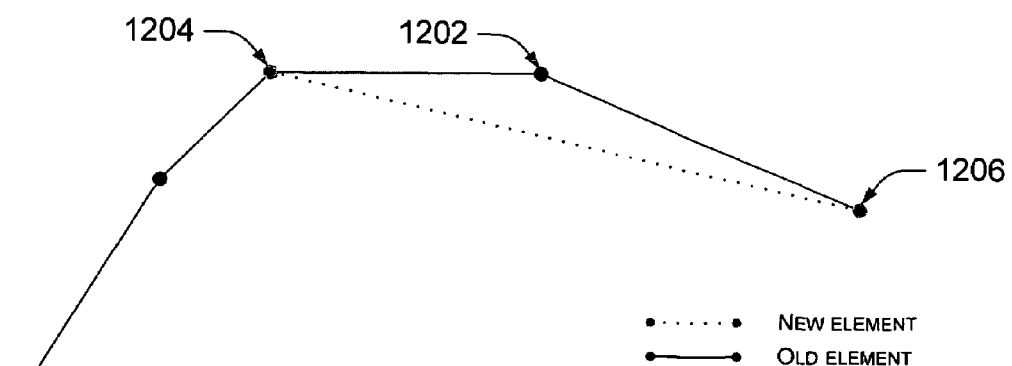
FIG. 12 is a diagram of another exemplary technique for simplifying a calculated river border.

In general, there are two basic exemplary vertex operations. Both use three consecutive vertices. These two operations differ in the middle vertex's position: inner or outer. For an outer vertex 1102, as shown in FIG. 11, the border line simplifier 220 eliminates the outer vertex 1102 and moves out the two ends 1104, 1106. For an inner vertex 1108, as shown in FIG. 12, the border line simplifier 220 eliminates the inner vertex 1108 and connects a new element between the remaining vertices 1110 and 1112.

Figure 13:
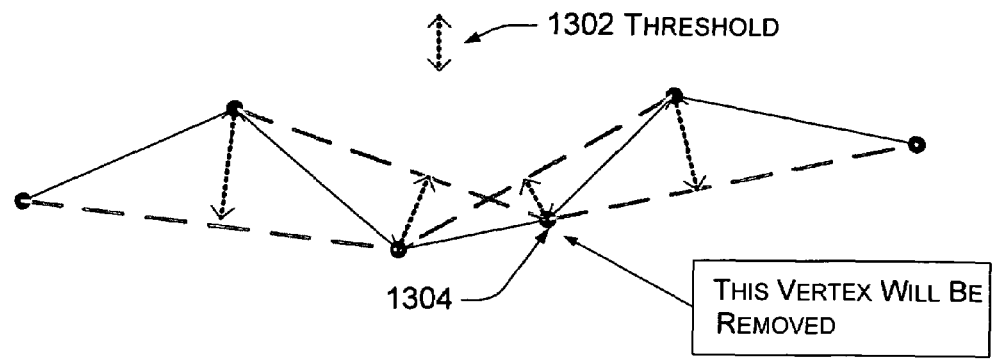
FIG. 13 is a diagram of another exemplary technique for simplifying a calculated river border based on error.

As shown in FIG. 13, a first simplification is aimed at minimizing the simplification error. That is, the border line simplifier 220 removes match and/or parameterization error below a threshold 1302. This can be achieved, for example, by removing a vertex 1304 to change the match and/or the parameterization.

The following pseudo code gives an example of simplification to minimize error:

```
{
  Do
  {
    For each border point consecutively
      if ( the distance from this point to the line constructed by the neighbor two points is less than a threshold error )
      {
        Remove the middle vertex if removal does not cause additional problems
      }
  } while there are still points being removed
}
```

Figure 14:
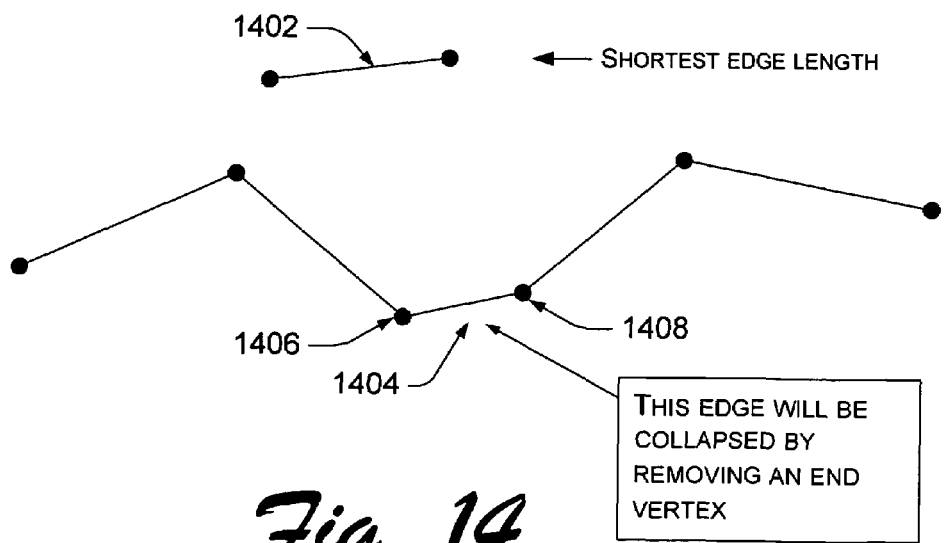
FIG. 14 is a diagram of another exemplary technique for simplifying a calculated river border based on minimum line segment lengths.

As shown in FIG. 14, a second simplification is aimed at removing vertices in order to make all edge lengths greater than a threshold minimum edge length 1402. In other words, edges that are too short 1404 are collapsed by removing an end vertex 1406 or 1408. The minimum edge length 1402 should not be longer than the river width, or else some artifacts may occur.

The following pseudo code gives an example of simplification to control edge lengths, such as removing vertices to make edge lengths above a threshold value:

```
{
  For each border edge consecutively
  {
    If ( The distance from this point to the next neighbor is less than a
    threshold edge length )
      Remove the middle vertex if it does not make a river edge higher
      than a terrain height and the original points are enclosed
      by the newly formed edge
  }
}
```

Surface Engine

Given the river borders (502, 504) the surface engine 206 builds a realistic graphical structure—a triangularized river mask—that will eventually underlie the appearances of a water surface for the river. The triangulation engine 222 builds triangles to begin rendering a river surface. In one implementation, the triangulation engine 222 uses Delaunay triangulation to give view-dependent, uniformly distributed, and "level of detail" (LOD)-ready triangles. If a pixel shader used for rendering the river does not support a projection bump map, then the triangulation engine 222 produces a relatively dense mesh while avoiding a bottle-neck effect.

In one implementation, the triangulation engine 222 has a vertex buffer that holds all vertices of the whole river. A 32-bit index buffer can hold the triangles in "triangle list" temporarily. The triangulation engine 222 builds a 16 bit index buffer and optimizes it when it splits the river into blocks.

In one implementation, there are two kinds of nodes in river's polyline, river nodes and waterfall nodes. A river node indicates that the river border on which the node resides and surface around this node are continuous. A waterfall node indicates a "vertical gap" in the watercourse, causing a downriver portion and an upriver portion. A waterfall is placed to fill the vertical gap. Thus, the triangulation engine 22 splits the entire river into segments at each waterfall node, if any. Each segment still has two continuous borders.

The triangulation engine 222 can use many different triangulation techniques to perform the actual triangulation, such as constrained conforming Delaunay triangulation (CCDT). In one implementation, the triangulation engine 222 uses a conventional triangulation library called TRIANGLE by Jonathan Richard Shewchuk. Information about TRIANGLE can be found at (http:/2.cs.cmu.edu/~quake/triangle.html). It should be noted that although TRIANGLE is currently freely available, it is copyrighted by the author and may not be sold or included in commercial products without a license.

TRIANGLE is a two-dimensional quality mesh generator and Delaunay Triangulator software that can produce high quality triangle mesh by utilizing a CCDT algorithm. A constrained conforming Delaunay triangulation—CCDT—of a planar straight line graph (PSLG) is a constrained Delaunay triangulation that includes Steiner points. It usually requires fewer vertices to make a good-quality CCDT than a good-quality conforming Delaunay triangulation (CDT), because the triangles do not need to be Delaunay (although they still must be constrained Delaunay). TRIANGLE ensures that all angles in the mesh are larger then twenty degrees and that the maximum triangle area is no larger then a user-specific threshold.

Figure 15:
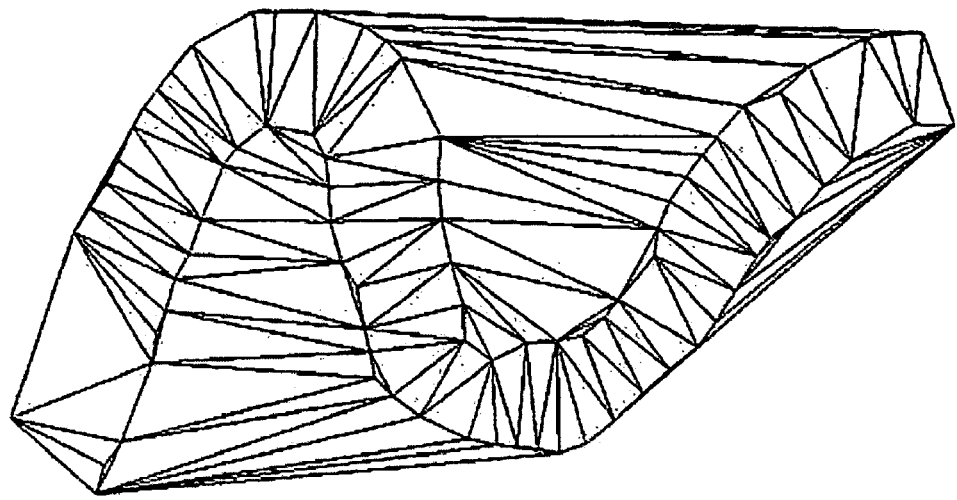
FIG. 15 is a diagram of a river surface model triangulated between exemplary borders.
Figure 16:
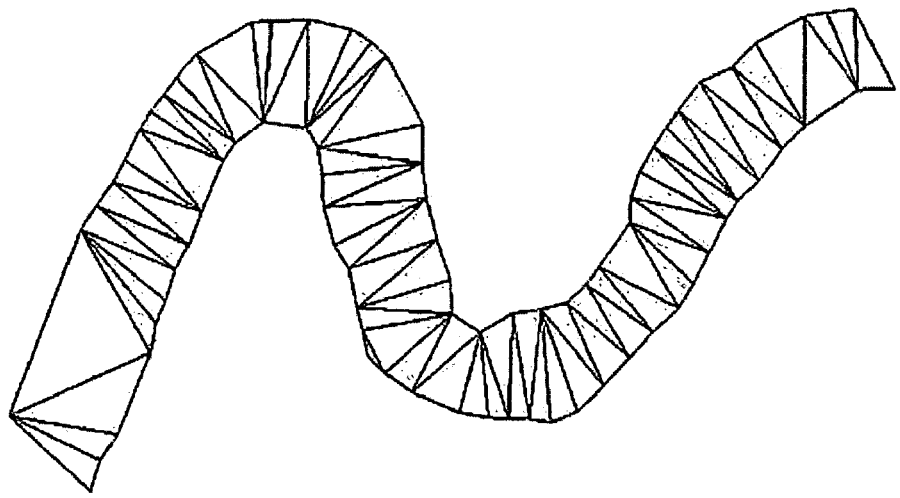
FIG. 16 is a diagram of a river surface model triangulated between exemplary borders with extraneous triangles removed.
Figure 17:
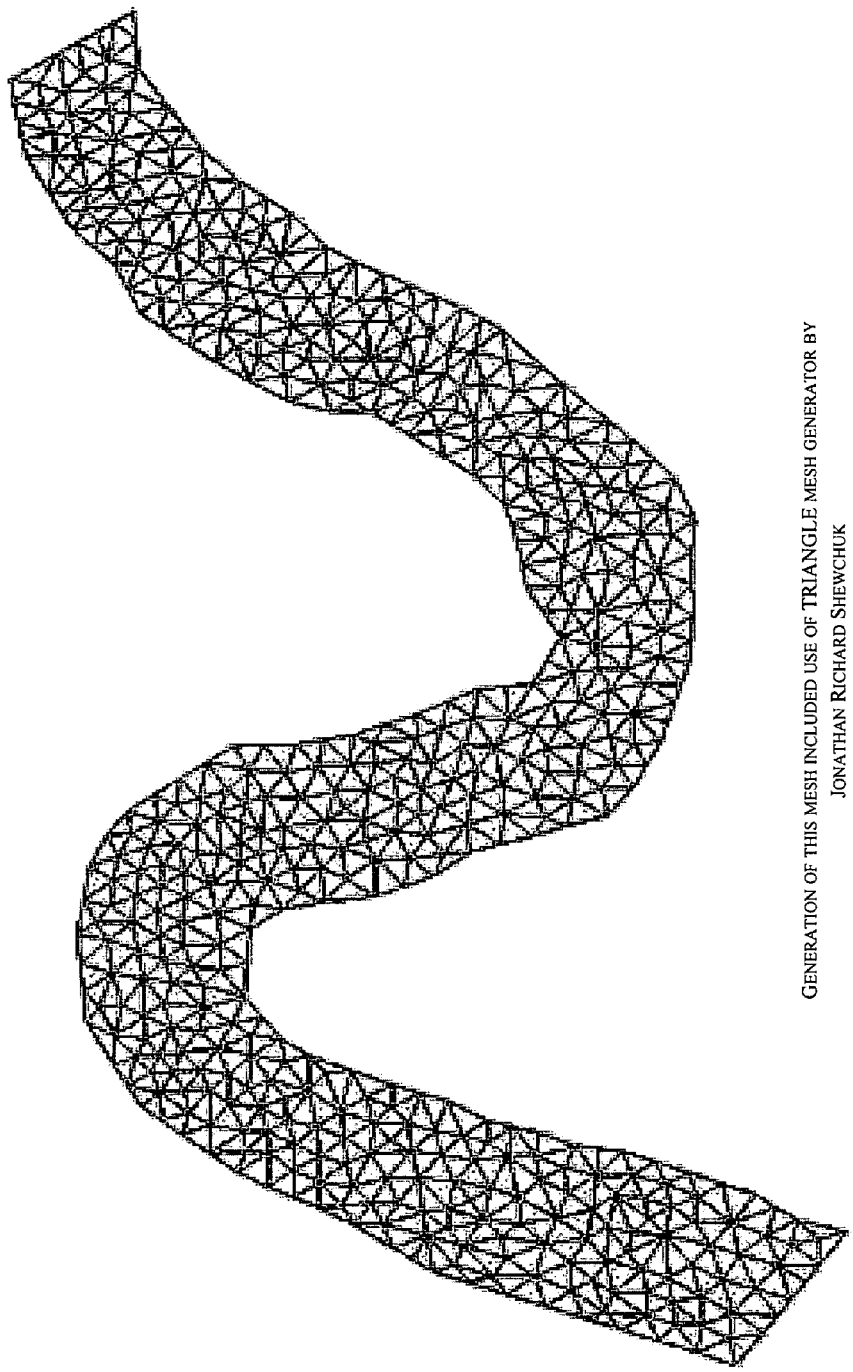
FIG. 17 is a diagram of an exemplary river surface mesh.

FIGS. 15-17 show various parts of an exemplary triangulation technique. In FIG. 15, the triangulation engine 222 performs a Delaunay triangulation of the vertices of a planar straight line graph—PSLG). In FIG. 16, the triangulation engine 222 removes the formed triangles from concavities and holes. Then, in FIG. 17, the triangulation engine 222 refines the triangulated mesh to conform to the constraints of minimum angle and maximum area, as introduced above.

Figure 18:
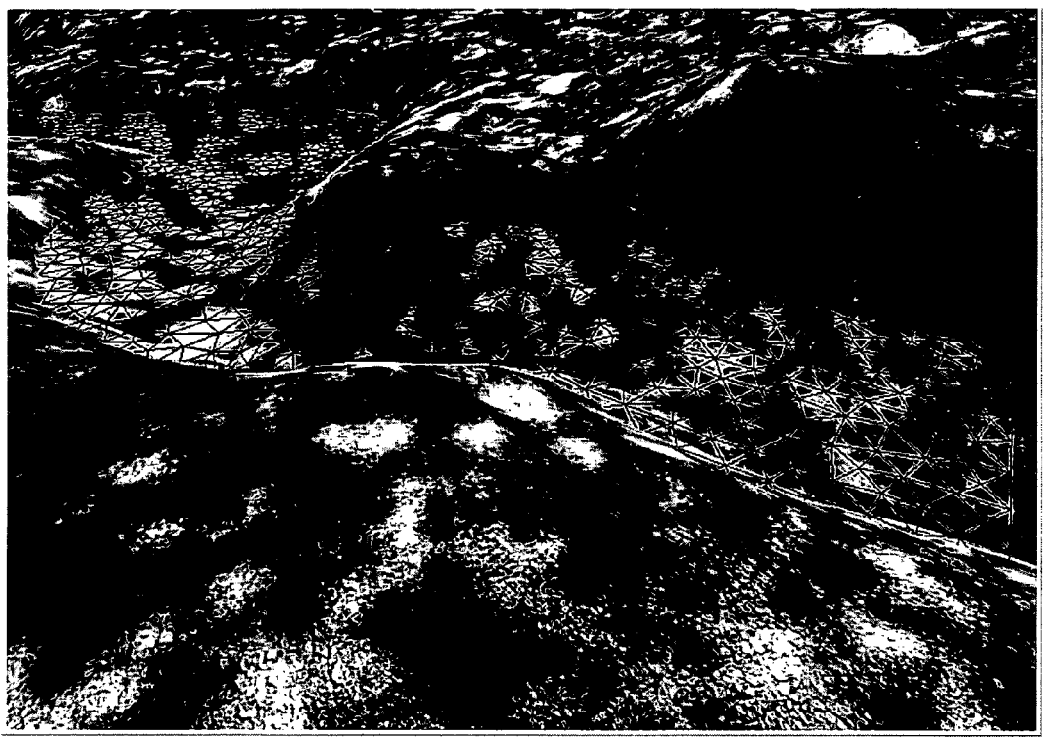
FIG. 18 is a diagram of an exemplary parametric river surface generated on a modeled terrain by the exemplary river modeling engine.

As shown in FIG. 18, the triangulation engine 222 produces a river surface structure between the two borders (502, 504) that were previously calculated by the border engine 204. The triangulation engine 222 enhances a 3-dimensional perspective of the river surface by producing large triangles in the foreground (at the river's high point) and increasingly smaller triangles as the river flows downhill into the distance.

UV Mapper

The exemplary surface engine 206 also includes a UV mapper 224. The UV mapper gives texture coordinates to the river mesh according to the centerline correspondence. "UV" as used herein retains its usual meaning of u,v texture coordinates, which are positions within an ideal 1-by-1 image. These coordinates connect to points in the river mesh, in order to position an image texture on the mesh. Thus, they position an exact spot of an image to a point on the river mesh's parametric surface. Between u,v coordinates, the UV mapper 224 typically renders the river by stretching the image smoothly, i.e., performs UV mapping. In one implementation, the UV mapper 224 can perform real-time hardware-based shading routines for texture interpolation.

In one implementation, the UV mapper 224 includes a quality selector 225 that allows various quality modes and execution speeds. For example, in a game quality mode, the quality selector 225 allows the UV mapper 224 and thus the river modeling engine 102 to be used as a rendering engine in a game or simulator, providing high visual quality. In a "design" mode, the quality selector 225 allows the UV mapper 224 and thus the river modeling engine 102 to be used at lower visual quality but greater speed as an artist's tool for developing river and/or terrain drawings.

In the design mode, the UV mapper 224 maps texture coordinates to the river mesh by projecting vertex points to the centerline perpendicularly—a technique that is closely related to nearest point problem (see, for example, "Solving the nearest point on curve problems," Graphics Gems, XI, 7). The faster "design" mode is used for an artist to get quick feedback. By previewing and reading the exemplary modeling tool's error, the artist can edit and perfect the modeled river and terrain.

In game quality mode, the UV mapper 224 can use Least Square Conformal Mapping to give the final results. The UV mapper 224 tries to avoid applying texture coordinates that would result in the wrong flow direction along a strait watercourse.

In one implementation, the UV mapper 224 finds a root-set of each vertex. For each Bezier curve of the centerline, the UV mapper 224 finds root points on it. If there are no roots on a curve, then the UV mapper 224 treats the two end-points instead. Then, the UV mapper 224 finds the nearest among root points, and pushes any root point that has a distance less then 1.5 times the nearest distance to the root-set. If the nearest root point is a "real root", then the UV mapper 224 drops all "end-points" from the root-set.

The UV mapper 224 then produces the final mapping points based on the root-set. It assigns each root its weight according to (R−d)/R where R is 1.5 times the nearest distance and d is the current root distance. The UV mapper 224 then normalizes all weights.

Next, the UV mapper 224 calculates arc-length of each root by blending all lengths based on their weights. To generate the UV coordinates, the UV mapper 224 uses the distance to the curve as "u" and uses the average arc-length as "v." In one implementation, to get correct and stable results, a floating point unit (FPU—the coprocessor that performs calculations on floating point numbers) should be set to stay in 64-bit precision mode. This can be achieved by a function call:

_controlfp(_PC_64,_MCW_PC);

In one implementation, when the river modeling engine 102 is being used as an artist's preview tool, the UV mapper 224 may produce artifacts, i.e., when certain root sets have multiple elements. This may happen when a border is too far away from the centerline or the centerline is too curvy. To provide a clear view for the artist, the UV mapper can mark such a part of the river mesh with different color in the preview window. Information on "bad vertices" can also be stored in reserved bytes of the vertex structure, used in a wire frame mode.

Illumination Engine

The illumination engine 208 makes it possible to render the river surface in real-time (>60 frames per second) using a bump map 240, with Fresnel reflection and refraction. Texture coordinates of the bump map can be animated to simulate flowing river water. These techniques are very useful for interactive real-time river modeling that is realistic in applications.

Figure 19:
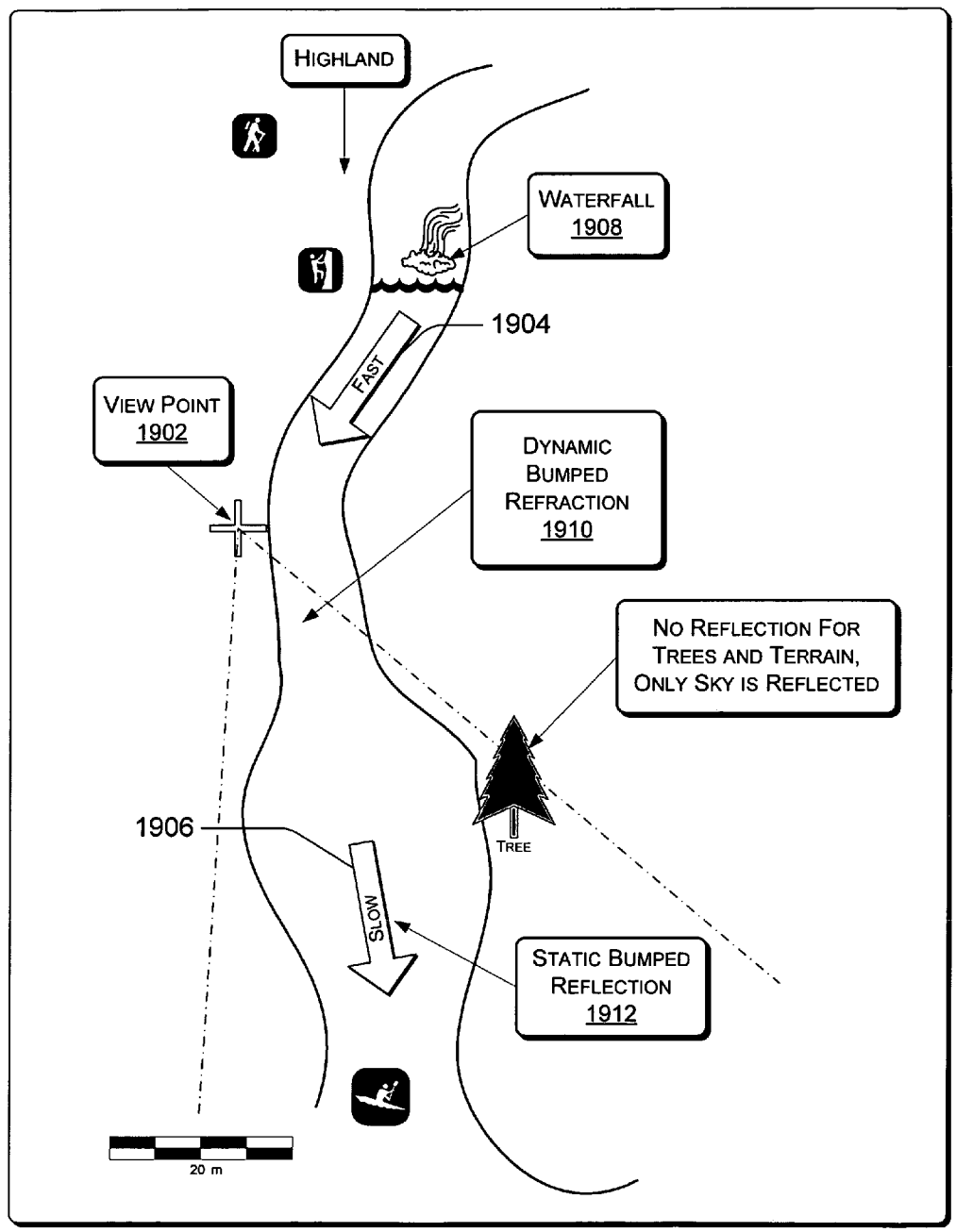
FIG. 19 is a diagram of an overview of exemplary river illumination techniques.

FIG. 19 presents an overview of exemplary river illumination features. From a given viewpoint 1902, the illumination engine 208 provides advanced lighting effects that add realism to a river scene. The river scene is animated (moving) and may include diverse scenery features, such as different distances for different river segments, different water speeds at different parts of the river (1904, 1906), waterfalls 1908, various surface waveforms, bumped refraction 1910 at parts of the river where the viewpoint allows one to see under the top surface of the water, and bumped reflection 1912 at parts of the river where the distance results in wave reflection, e.g., at an oblique viewing angle.

Referring back to FIG. 2, the illumination engine 208 usually includes a vertex shader 242 and a pixel shader 246, and may be implemented by using the vertex shader 242 and pixel shader 246 in a computing device's graphics card or in a game console. In light of the features introduced above, the action of an exemplary illumination engine 208 may be understood in terms of two concepts, Fresnel bump mapping and view-dependent representation of wave geometry.

Figure 20:
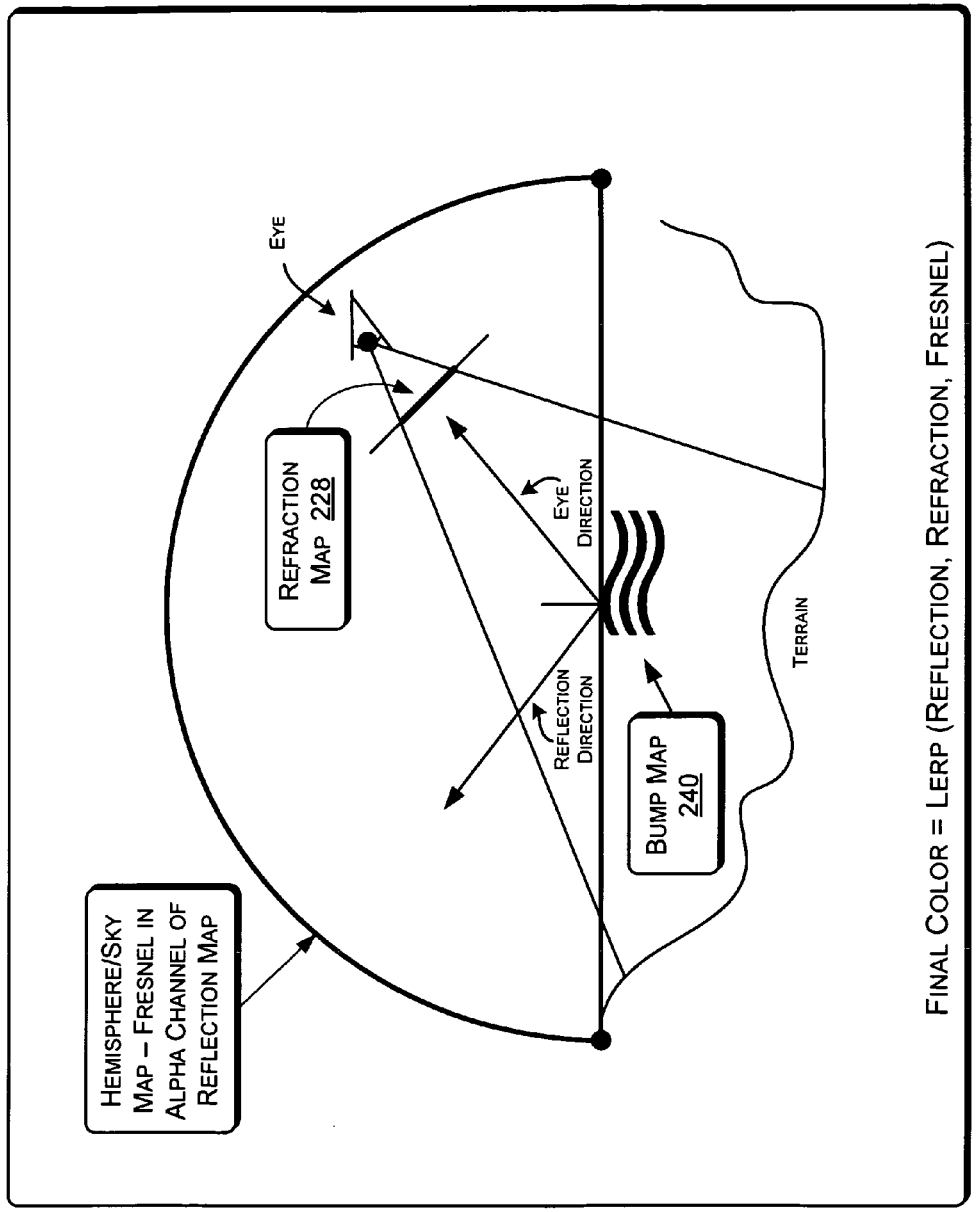
FIG. 20 is a diagram of exemplary river illumination.

As shown in FIG. 20, the first of the two concepts, Fresnel bump mapping, is a technique for efficiently rendering per-pixel Fresnel reflection and refraction on the dynamic bump map 240 using graphics hardware. In one implementation, the accurate rendering of Fresnel effects on a dynamic bump map 240 plays a critical role in recreating the look and feel of river water. The second concept, view-dependent representation of wave geometry, allows the illumination engine 208 to realistically describe geometry of nearby waves, while efficiently handling description of distant waves.

Implementations of the illumination engine 208, which assist the river modeling engine 102 to synthesize and render the river in real-time, can include components that participate in one or both of preprocessing and real-time rendering. Thus, a given illumination engine 208 can have a preprocessing stage and a rendering stage. In one implementation, the dynamic bump map 240 can be generated in the preprocessing stage, along with the triangularized river mask. The dynamic bump map 240 is applied during the rendering stage to enhance the details of the wave surface. The dynamic bump map 240 is augmented with a pre-computed Fresnel texture 238 for fast evaluation of a Fresnel term on the bump map 240. The viewpoint engine 244 may also construct a view-dependent representation of river wave geometry in the preprocessing stage. This representation can consist of visual distance patches, such as a near patch and a far patch.

In one implementation, for each river scene to be actualized, the illumination engine 208 may make four passes on a graphics card. The first two passes generate the reflection map 232 and the refraction map 228. The third pass calculates the shadow map 234 to account for the look of sunlight on the water. This pass typically has a very low processing cost. The final pass draws the view-dependent wave geometry with bump mapping, reflection, refraction, Fresnel effects, sunlight reflection, and shadows. The fact that the final rendering can be done in a single pass is important for rendering speed because of the high fill rate of water rendering. This efficiency is attributable to the design of the illumination engine 208, which aims to move much of the workload to the preprocessing stage.

Figure 21:
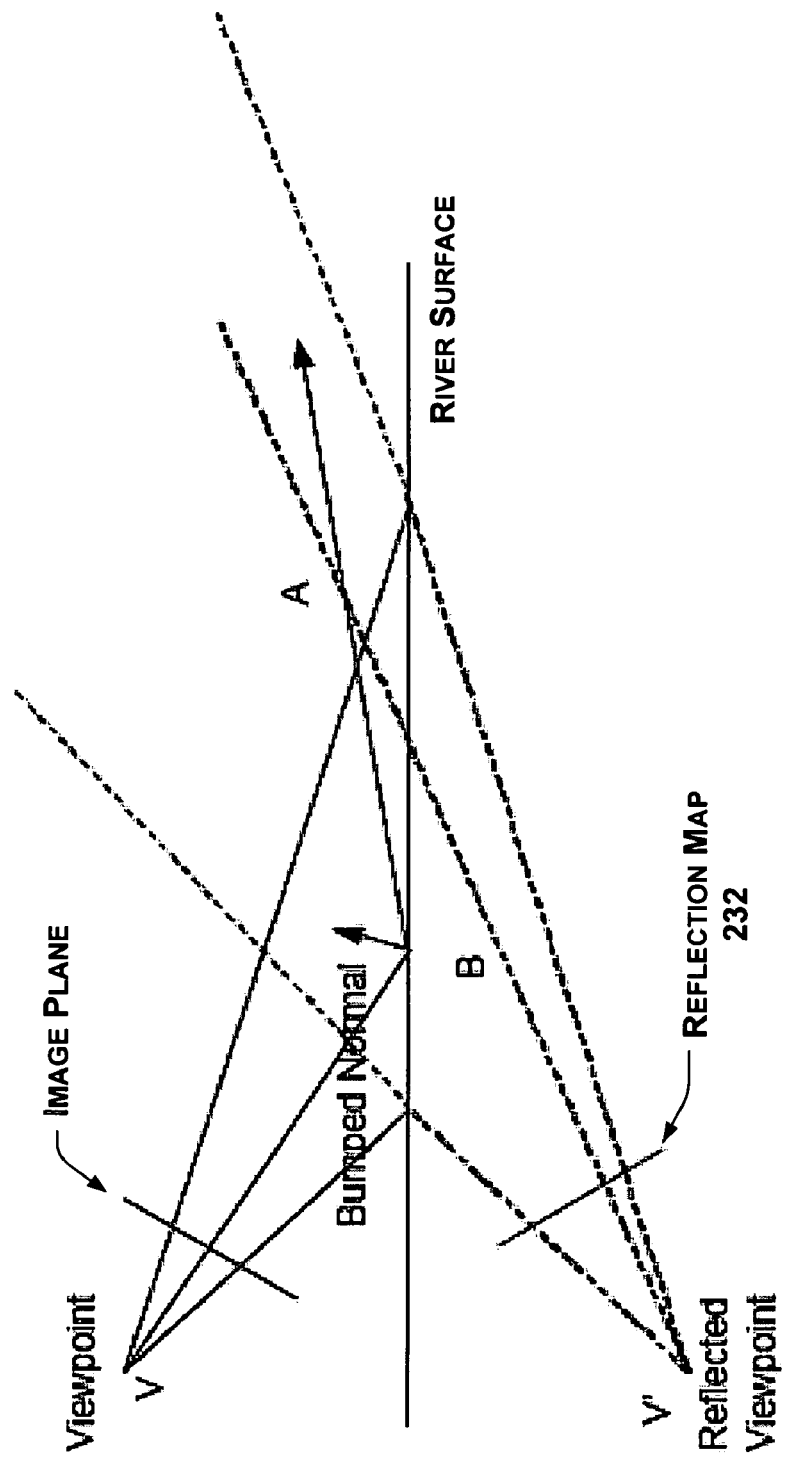
FIG. 21 is a diagram of exemplary reflection map generation.

The refraction engine 226 and the reflection engine 230 generate a refraction map 228 and a reflection map 232 (as shown in FIG. 21) by rendering objects above and below the water plane into textures. In a river, light is both scattered and absorbed in relation to the volume of water. This attenuation effect that a volume of water has on light scattering and absorption is approximated by shading effects during generation of the refraction map 228. The illumination engine 208 can accomplish this volumetric attenuation by using a fog-form depth shader. The shadow map 234 is usually rendered into the alpha channel of the reflection map 232. Both the reflection map 232 and the refraction map 228 are used as projective texture maps when the illumination engine 208 performs rendering.

Referring to FIG. 21, in order to generate the reflection map 232, the reflection engine 230 transforms objects above the water surface to their symmetric position under the water plane. For a given run, these objects are calculated from a given viewpoint and the results are saved into the reflection map 232.

After the illumination engine 208 obtains the reflection map 232, refraction map 228, and the shadow map 234, the illumination engine 208 can render the river surface using the available graphics processing unit (GPU). The vertex shader 242 transforms the river surface based on a current viewpoint from the viewpoint engine 244. The illumination engine 208 then generates texture coordinates at each vertex for the bump map 240, reflection map 232, and refraction map 228.

The pixel shader 246 loads the bump value from the dynamic bump map 240 for given texture coordinates. Then, the Fresnel engine 236 finds the Fresnel term, the reflection engine 230 finds the reflection color, and the refraction engine 226 finds the refraction color, for each pixel. The bump value from the dynamic bump map 240 is used in this step to perturb the texture coordinates. In one implementation, a specular color engine 250 also computes the specular color caused by sunlight on or in water for each pixel. After these steps, the illumination engine 208 finally composites all these components together.

Figure 22:
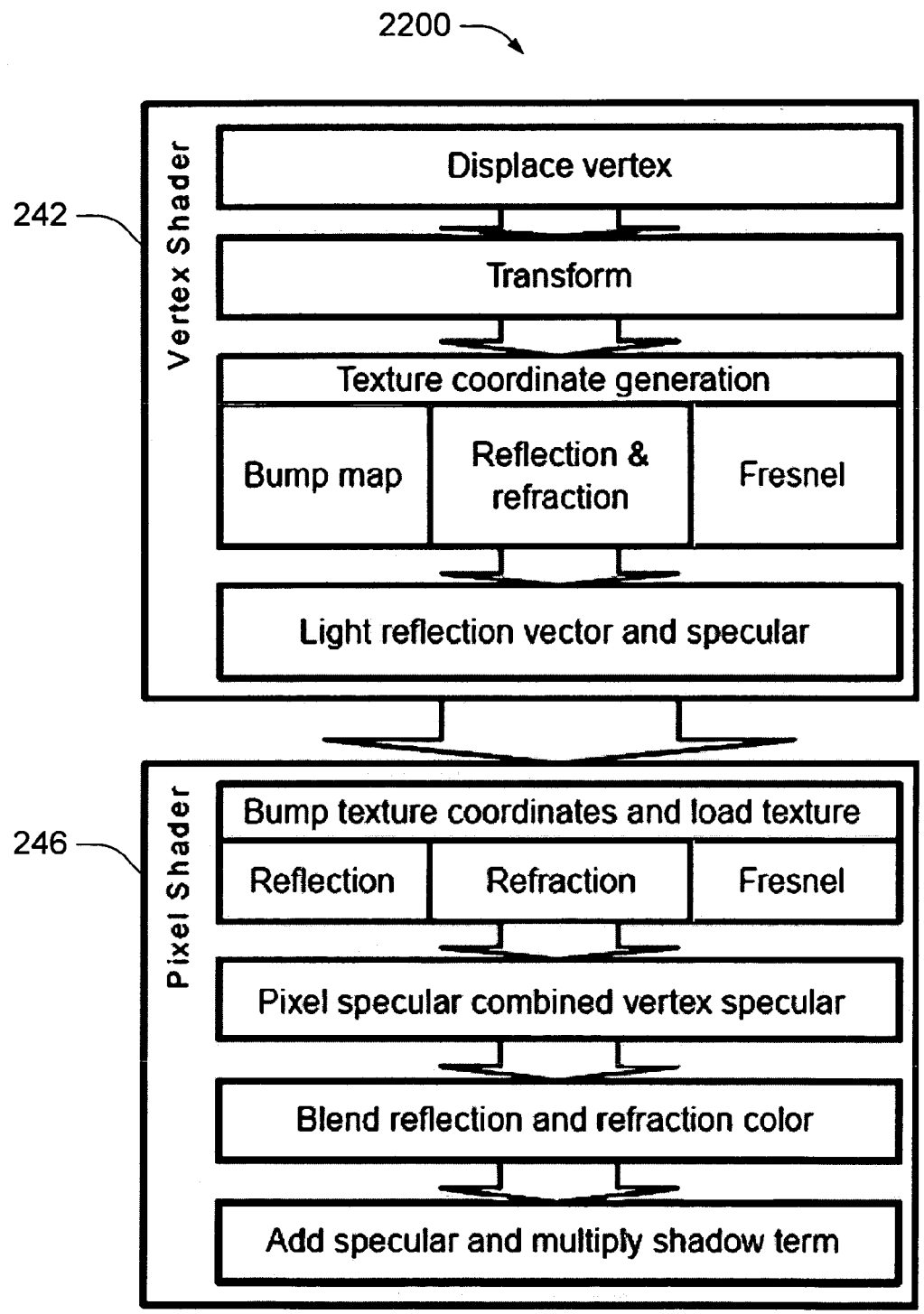
FIG. 22 is a flow diagram of exemplary vertex shading and pixel shading processes.

FIG. 22 shows one implementation of a process 2200 performed by the illumination engine 208 that achieves the single-pass capability for the final river rendering on a graphics card, such as a GEFORCE3 graphics card (Nvidia Corp., Santa Clara, Calif.). The illumination engine 208 inputs the river mesh vertices' 2-dimensional positions (i.e., coordinates on the river surface triangulated mask) into the vertex shader 242. To compute the lighting effects, the viewpoint engine 244 also inputs the viewpoint position and the sunlight direction.

The vertex shader 242 first transforms the river mesh to the world space and then finds vertex heights, which are available from the border engine 204. Then each vertex's 2-dimensional position on the surface mesh is used as the texture coordinates for the dynamic bump map 240, reflection map 232, and refraction map 228. In one implementation, the vertex shader 242 uses the reflection vector of a vertex as a lookup vector for the Fresnel map 238. Also, texture coordinates of the dynamic bump map 240 can be animated with respect to time, in order to simulate the water flow. The vertex alpha can be calculated by a depth value of the vertex, as shallow areas of water have more transparency.

In the pixel shader 246, for each pixel, the dynamic bump map 240 is used to perturb the Fresnel, reflection, and refraction texture coordinates. Using the perturbed texture coordinates the illumination engine 208 can obtain the corresponding components by texture lookups. In one implementation, after the specular color engine 250 computes the specular color resulting from the sunlight, the illumination engine 208 combines all these components together to get the final pixel color. In one example combining technique, the illumination engine 208 performs linear interpolation (LERP) of the reflection, refraction, and Fresnel textures to determine the final color of a pixel.

In one implementation, the illumination engine 208 inputs textures and then performs a sequence of steps via the pixel shader 246. The inputting of textures may include inputting: a static version of the bump map 240, a static environment map (RGBA), a sky texture (RGB), a Fresnel texture in the alpha channel, and a dynamic refraction map 228 that is updated for each frame. Thus, the illumination engine 208 looks up the dynamic bump map 240, and other textures are also looked up, e.g., using the "texbem" pixel shader instruction. The illumination engine 208 then combines the sky and the refraction, based on the Fresnel value. This combination can then be combined with a diffuse texture by a predefined constant factor. These results can be output as a RGB color.

The water depth appearance can be dependent on a terrain's color. If the color of the river bed is the same as the non-river terrain, the river can have the unnatural appearance of water in a cup—as if the river and the river bed were optically separate. To add realism, the illumination engine 208 can shade the river bed with green or a "dirty" mixture of colors, depending on the intervening volume of water.

Figure 23:
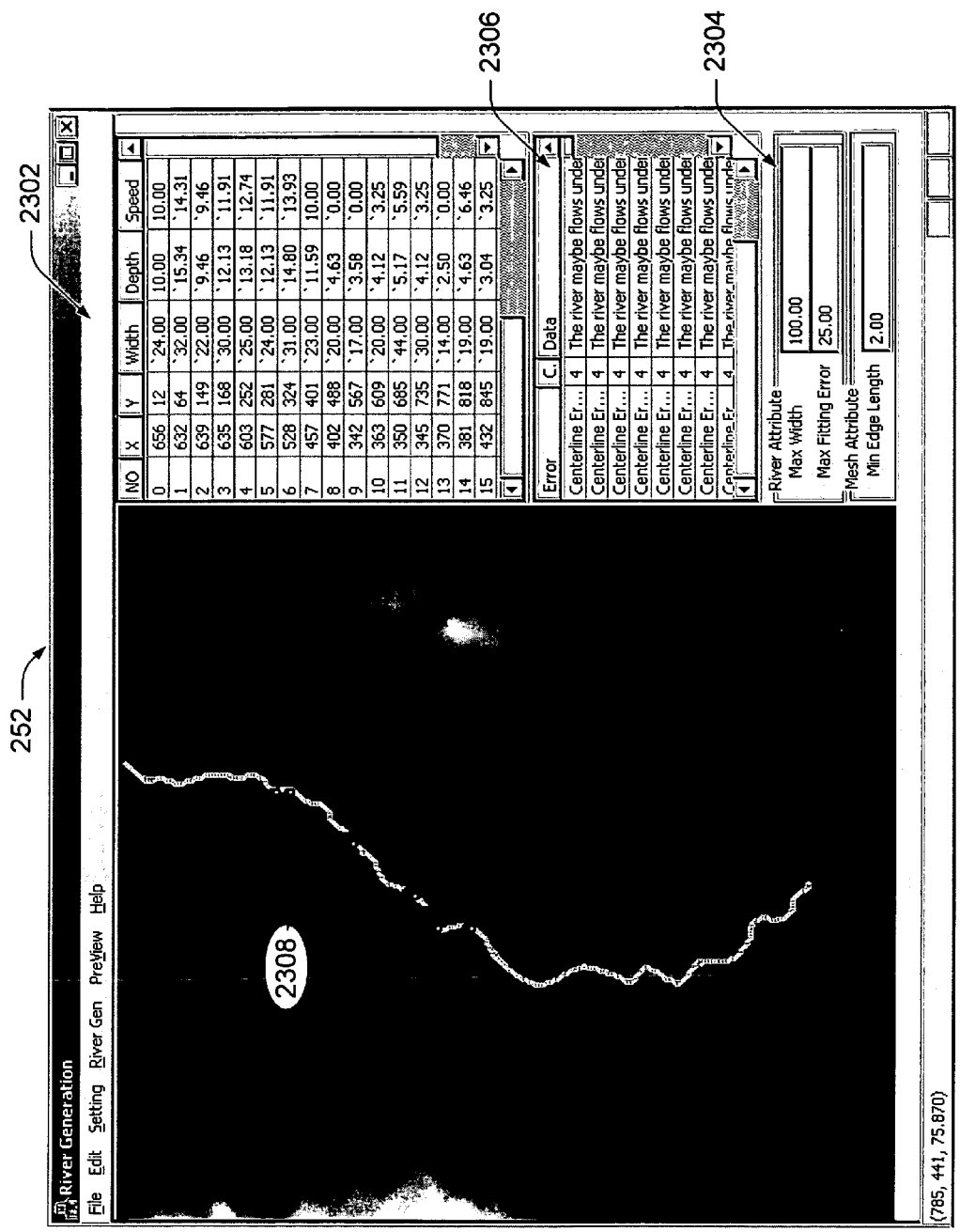
FIG. 23 is a screenshot of an exemplary user interface of the exemplary river modeling engine.

FIG. 23 shows a user interface (UI) 252 of the exemplary river modeling engine 102 used as a modeling tool or previewer that an artist or game architect can use to edit river and terrain polylines during game or simulation development. The UI 252 can be used, for instance, when the UV mapper 224 is set to "design" quality by the quality selector 225. The UI 252 may include an adjustment pane 2302 to allow the artist to adjust parameters, such as river width, depth, and speed at different nodes of the river. A specification pane 2304 may be included to allow the artist to select characteristics of the river and of the modeling techniques, for example, triangulation attributes or mesh generation attributes. An error panel 2306 may list errors, such as the river being above the terrain, a leaking border, etc. In one implementation, the UI 252 points out segments of the river that contain artifacts, e.g., the presence of artifacts as when an angle of sunlight or viewpoint is too oblique, etc.

Exemplary Methods

Figure 24:
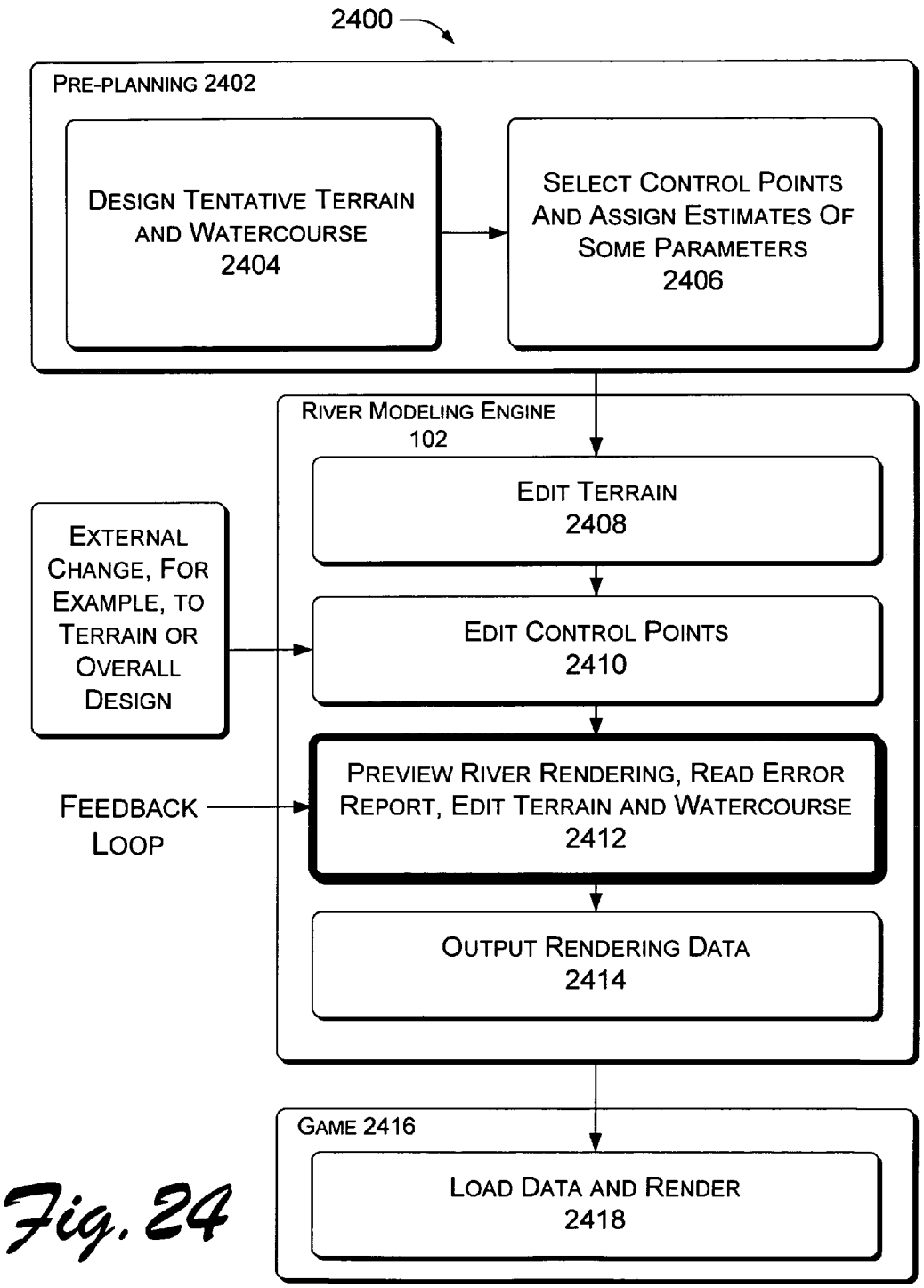
FIG. 24 is a flow diagram of an exemplary method for developing and previewing a modeled river.

FIG. 24 depicts an exemplary workflow method 2400 for using the river modeling engine 102 as an artist's preview and design tool, e.g., for developing polyline models of river and terrain for a game. In the flow diagram, the operations are summarized in individual blocks. Parts of the exemplary method 2400 may be performed by hardware, software, or combinations of both, for example, by components of the exemplary river modeling engine 102.

Block 2402 is a pre-planning stage, during which an artist or game architect may produce a draft of modeled terrain and modeled watercourse, for example, on paper or in a graphics design program for computer.

At block 2404, the artist designs a tentative terrain and watercourse. The design is usually a polyline rendering composed of straight lines joined together at nodes.

At block 2406, the artist selects control points/nodes and assigns some estimates of parameters, such as river width, depth, water speed, etc.

The next group of blocks can be performed by the river modeling engine 102. At block 2408, if a change is to be made to the river and terrain, then the artist edits the terrain first. The river modeling engine 102 can then provide a quick preview of the results. This is more efficient than trying to edit the river first and then the terrain, or editing the river first and running a preview when changes are still needed in the terrain.

At block 2410, the artist edits control points controlling the river. That is, if the artist desires a change to the river, the artist can modify parameters for control points, such as width, depth, speed, etc.

At block 2412, the river modeling engine 102 provides a core feedback loop for editing and improving the terrain and river. The artist may iteratively preview the river rendering, read an error report generated by the river modeling engine 102, and edit the terrain and watercourse, at blocks 2408 and 2410, respectively.

At block 2414, the river modeling engine 102 may output the rendering data for storage and/or use in a game or simulator.

Block 2416 represents a "game quality" rendering of the improved or perfected terrain and watercourse. At this block, the game can load the rendering data and render the river realistically, in real-time.

Figure 25:
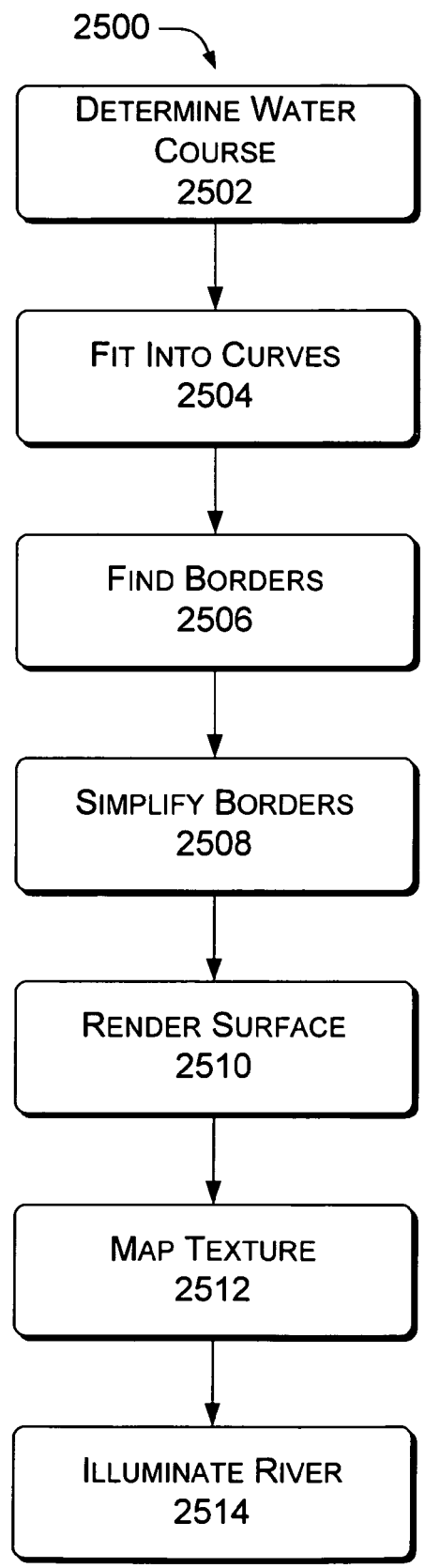
FIG. 25 is a flow diagram of an exemplary method of river modeling.

FIG. 25 shows an exemplary method 2500 for river modeling. In the flow diagram, the operations are summarized in individual blocks. The exemplary method 2500 may be performed by hardware, software, or combinations of both, for example, by components of the exemplary river modeling engine 102.

At block 2502, a watercourse is determined. The watercourse may be initially determined by an artist, e.g., in a polyline drawing, or may be automatically calculated by a watercourse engine component of an exemplary river modeling engine.

At block 2504, the watercourse, which may be relatively complex in light of subsequent computations to be performed, is simplified by fitting the watercourse into curves, e.g., modeling the watercourse with Bezier curves. Once the watercourse is described by Bezier curves, then the watercourse is in a mathematical form that lends itself well to subsequent computations.

At block 2506, the exemplary method 2500 finds river borders for the watercourse, i.e., in light of the terrain as provided by an artist. The contour lines of right and left river banks may be computed by adaptive interpolation of the piecewise Bezier curves from the previous block 2504 that describe the watercourse. Determining right and left river borders may be performed by a border engine component of an exemplary river modeling engine.

At block 2508, the river banks, which may exist at this stage only as sequences of points, are simplified into polylines to facilitate subsequent calculations. The segments of each right and left polyline may be assigned a minimum length, to further simplify the banks. In one implementation, the river banks are simplified to eliminate unnecessary complexity that does not add anything to the final graphical rendering but only drives up computational cost.

At 2510, a surface for the river is rendered. The polyline banks produced in the previous block 2508 facilitate triangulation of a polyline surface composed of triangles. The triangles thus formed can model various levels of detail and various physical features of a river surface, such as calm water, or waves. The surface rendering can be performed by a surface engine of an exemplary river modeling engine. Delaunay triangulation is one example of a triangulation technique that can be used.

At block 2512, the river surface from the previous block 2510 is mapped for texture. A UV mapper component of the river modeling engine may perform the mapping. The texture mapping assigns texture coordinates to the river mesh according to the centerline correspondence. The UV mapping may be performed in a high quality mode for game output, or performed in a low quality, high speed mode so that an artist can preview tentative terrain and water systems during their development.

At block 2514, the mapped river from the previous block 2512 is illuminated with realistic reflection, refraction, and Fresnel effects. In one implementation, the illumination using advanced lighting effects can be performed quickly, with real-time components being achieved in one pass of a graphics card. The illuminating of the river can be performed by the exemplary river modeling engine, and includes Fresnel bump mapping and view-dependent representation of wave geometry. Shadow mapping and specular color effects can also be included to add realism without compromising the real-time speed.

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems, engines, and methods for river modeling. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method for river modeling, comprising:
    determining a route for a simulated watercourse over a simulated terrain based on, at least, physical features of the simulated terrain, the simulated terrain comprising non-fluid terrain;
    calculating borders between the simulated watercourse and the simulated terrain based on, at least, the route and the simulated terrain;
    calculating a surface structure for the watercourse between the borders;
    mapping texture coordinates to the surface structure; and
    applying textures at the texture coordinates to provide a view-dependent representation of wave geometries for the surface structure including Fresnel reflection, refraction, and Fresnel effects associated with interactions between light and water.

2. The method as recited in claim 1, wherein the determining a route includes using an A* algorithm to search the physical features of the simulated terrain.

3. The method as recited in claim 1, wherein the determining a route includes approximating the route by fitting Bezier curves to the route.

4. The method as recited in claim 1, wherein the calculating borders includes adaptively interpolating the Bezier curves that approximate the route.

5. The method as recited in claim 1, wherein the calculating borders includes simplifying the borders by approximating the borders with line segments.

6. The method as recited in claim 1, wherein the rendering a surface includes performing Delaunay triangulation to produce view dependent triangles, wherein at least some of the view dependent triangles include line segments used to approximate the borders.

7. The method as recited in claim 1, wherein:
    the simulated watercourse has an associated fluid surface; and
    the calculating the borders comprises determining points of the simulated terrain that are above the fluid surface and that have neighboring points that are below the fluid surface.

8. The method as recited in claim 7, wherein:
    each border comprises a plurality of lines between vertices; and
    the calculating the borders further comprises determining if the middle vertex of three consecutive vertices is an inner vertex or an outer vertex.

9. The method as recited in claim 8, wherein the calculating the borders further comprises:
    determining if a distance between the first two of three consecutive vertices is less than a first threshold;
    if the distance between the first two consecutive vertices is less than the first threshold, determining if removing the second of the three consecutive vertices would raise a distance between the modified border and the simulated terrain above a second threshold; and
    if removing the second of the three consecutive vertices would not raise the distance between the modified border and the simulated terrain above the second threshold, removing the second of the three consecutive vertices.

10. A storage medium comprising a plurality of executable instructions which, when executed, implement a method according to claim 1.

11. A river modeling engine, comprising:
    a watercourse engine to determine a route for a watercourse to be modeled over a modeled terrain, based on, at least, physical features of the modeled terrain, the modeled terrain comprising non-fluid terrain;

a border engine to calculate borders between the watercourse and the modeled terrain based on, at least, the route and the modeled terrain;

a surface engine for calculating a surface structure model for the watercourse between the borders and for mapping texture coordinates to the surface structure model; and an illumination engine for applying textures at the texture coordinates to provide a view-dependent representation of wave geometries for the surface structure model including Fresnel reflection and Fresnel refraction effects associated with interactions between light and water.

12. The river modeling engine as recited in claim 11, further comprising a user interface for selecting watercourse parameters.

13. The river modeling engine as recited in claim 11, further comprising a user interface to provide a preview of river modeling.

14. The river modeling engine as recited in claim 11, wherein the watercourse engine approximates the route with Bezier curves and the border engine calculates borders by adaptively interpolating the Bezier curves that approximate the route.

15. The river modeling engine as recited in claim 11, wherein the surface engine performs Delaunay triangulation to produce the surface structure model as view dependent triangles.

16. The river modeling engine as recited in claim 11, wherein the illumination engine includes a reflection engine, a refraction engine, a Fresnel engine, and a specular color engine to provide lighting effects associated with the river modeling.

17. The river modeling engine as recited in claim 11, further comprising a bump map, a reflection map, a shadow map, a refraction map, and texture maps, wherein texture coordinates of the bump map are animated with respect to time, to simulate flowing water.

18. The river modeling engine as recited in claim 11, wherein the surface engine further includes a UV mapper and a quality selector, the quality selector to allow selection of a UV mapping quality and a rendering speed, the UV mapping quality and the rendering speed allowing the river modeling engine to be used as either a modeling preview tool or as a real-time rendering engine in a game.

19. A computer-implemented system for river modeling, comprising:

means for automatically generating a river watercourse route over a model of a terrain, the terrain comprising non-fluid terrain;

means for calculating river bank borders based on, at least, the model of the terrain;

means for generating a view-dependent water surface model between the river bank borders; and means for generating real-time view-dependent lighting for the water surface model.

20. The system as recited in claim 19, further comprising means for animating the water surface model and the lighting in real-time to produce a real-time modeled river.

* * * * *